(12) United States Patent
Tanaka

(10) Patent No.: US 11,150,450 B2
(45) Date of Patent: Oct. 19, 2021

(54) ZOOM LENS, IMAGING OPTICAL DEVICE, AND DIGITAL DEVICE

(71) Applicant: Konica Minolta Inc., Tokyo (JP)

(72) Inventor: Hiroaki Tanaka, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 184 days.

(21) Appl. No.: 16/682,799

(22) Filed: Nov. 13, 2019

(65) Prior Publication Data

US 2020/0158998 A1 May 21, 2020

(30) Foreign Application Priority Data

Nov. 15, 2018 (JP) .............................. JP2018-214509

(51) Int. Cl.
*G02B 15/14* (2006.01)
*G02B 15/163* (2006.01)
*G02B 27/64* (2006.01)

(52) U.S. Cl.
CPC ....... *G02B 15/1461* (2019.08); *G02B 15/163* (2013.01); *G02B 27/646* (2013.01)

(58) Field of Classification Search
CPC .... G02B 15/1461; G02B 15/14; G02B 15/15; G02B 15/155; G02B 15/16; G02B 15/163; G02B 15/167; G02B 15/17; G02B 15/173; G02B 15/177; G02B 15/20; G02B 27/646

USPC .......................................................... 359/557
See application file for complete search history.

(56) References Cited

U.S. PATENT DOCUMENTS

| | | | | |
|---|---|---|---|---|
| 5,189,557 A | * | 2/1993 | Endo ................... | G02B 15/1461 359/683 |
| 7,961,402 B2 | * | 6/2011 | Saori .................. | G02B 15/1461 359/683 |
| 2013/0235466 A1 | * | 9/2013 | Iwamoto .............. | G02B 15/173 359/683 |

FOREIGN PATENT DOCUMENTS

| | | |
|---|---|---|
| JP | 2010198012 A | 9/2010 |
| JP | 2017116645 A | 6/2017 |

\* cited by examiner

*Primary Examiner* — Kristina M Deherrera
(74) *Attorney, Agent, or Firm* — Rankin, Hill & Clark LLP

(57) ABSTRACT

A zoom lens includes: in order from an object side, a first lens group having positive refractive power; a second lens group having negative refractive power; a third lens having positive refractive power; a fourth lens group having negative refractive power; a fifth lens group having positive refractive power; and a sixth lens group having negative refractive power.

8 Claims, 29 Drawing Sheets

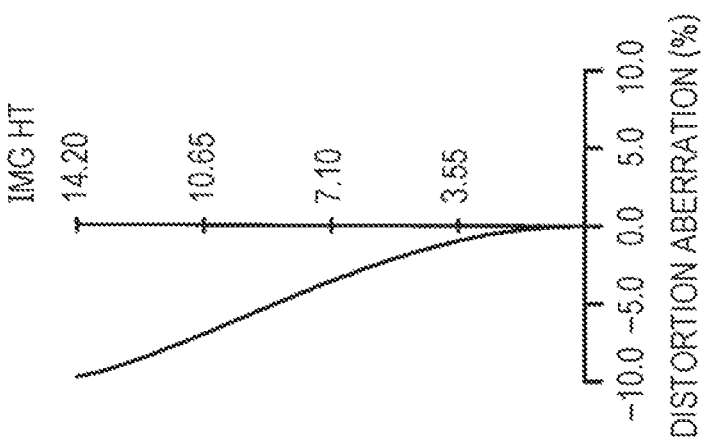
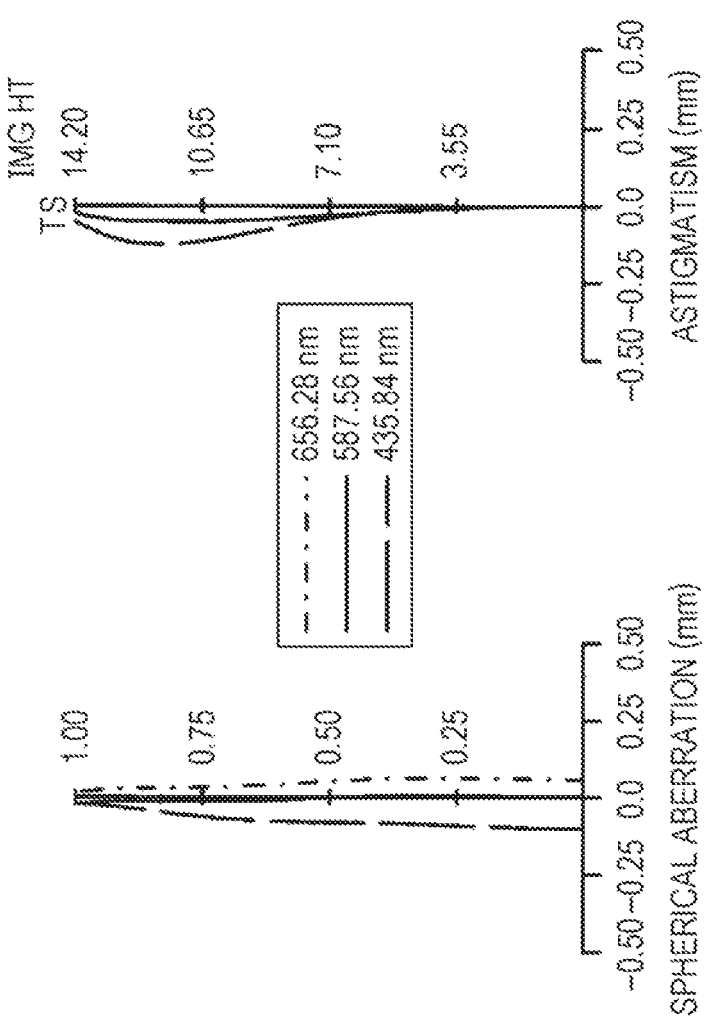
FIG. 8A  FIG. 8B  FIG. 8C

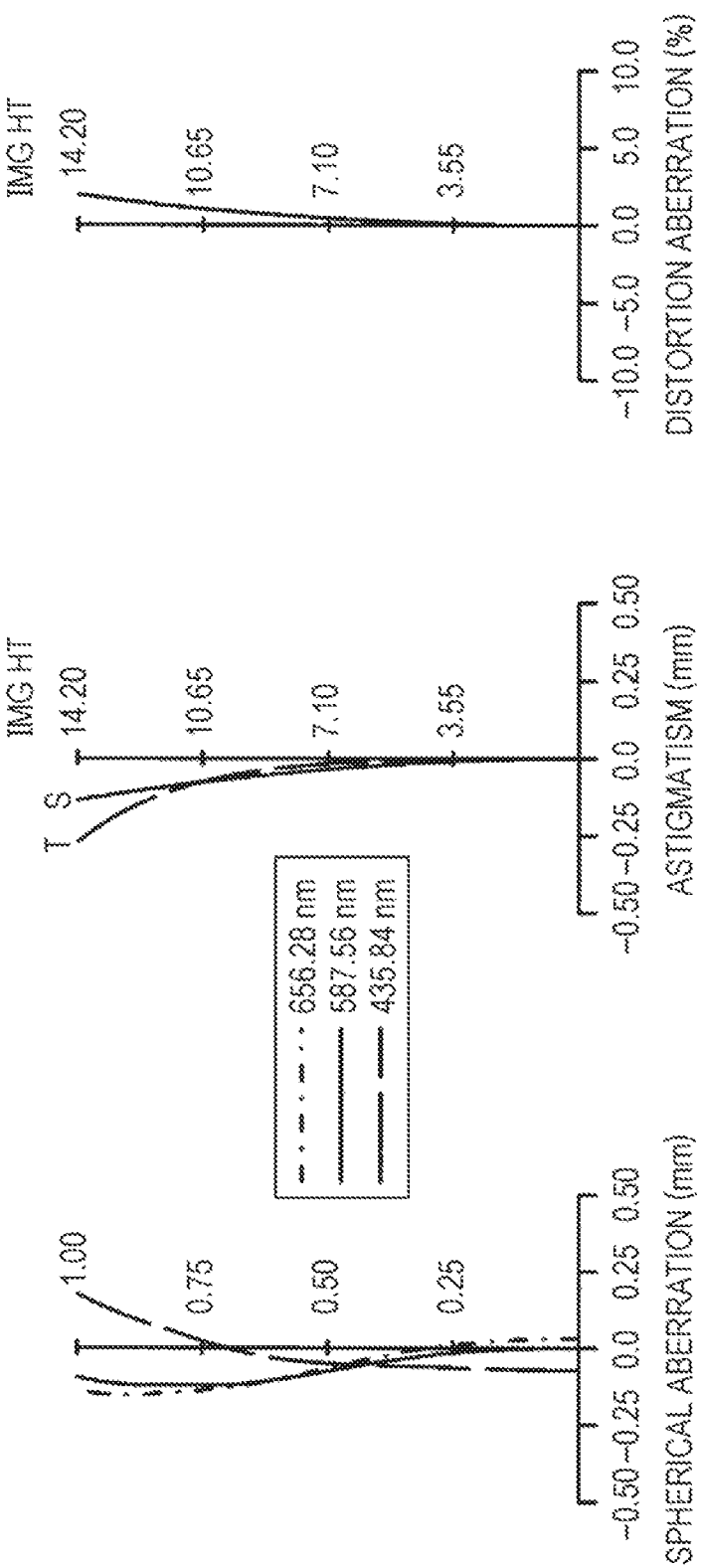

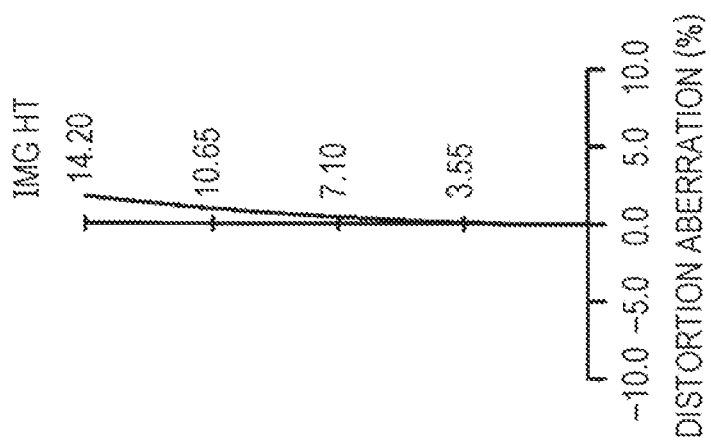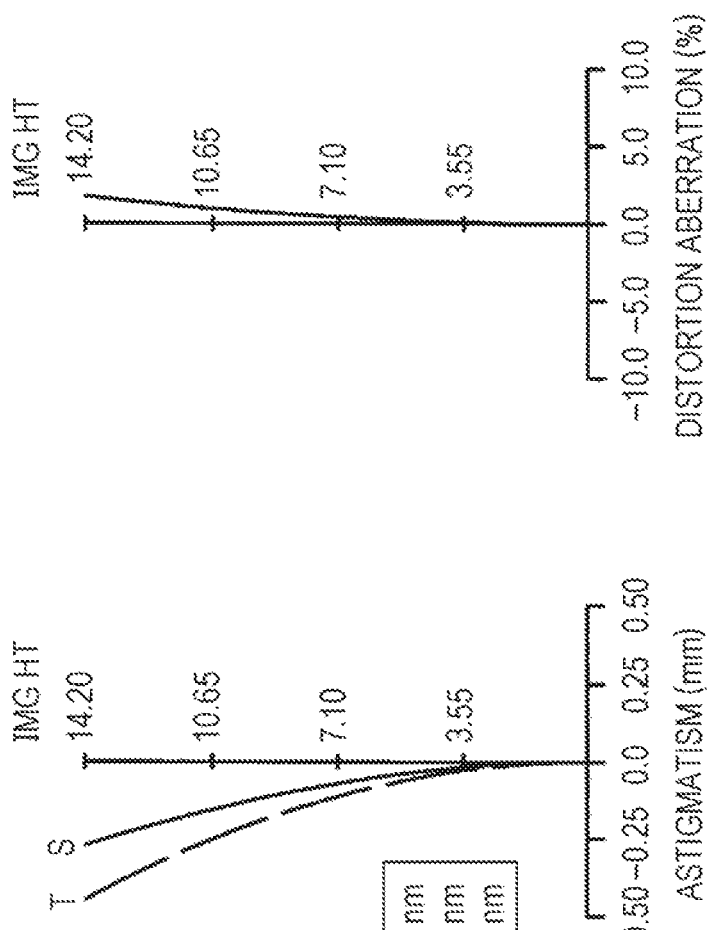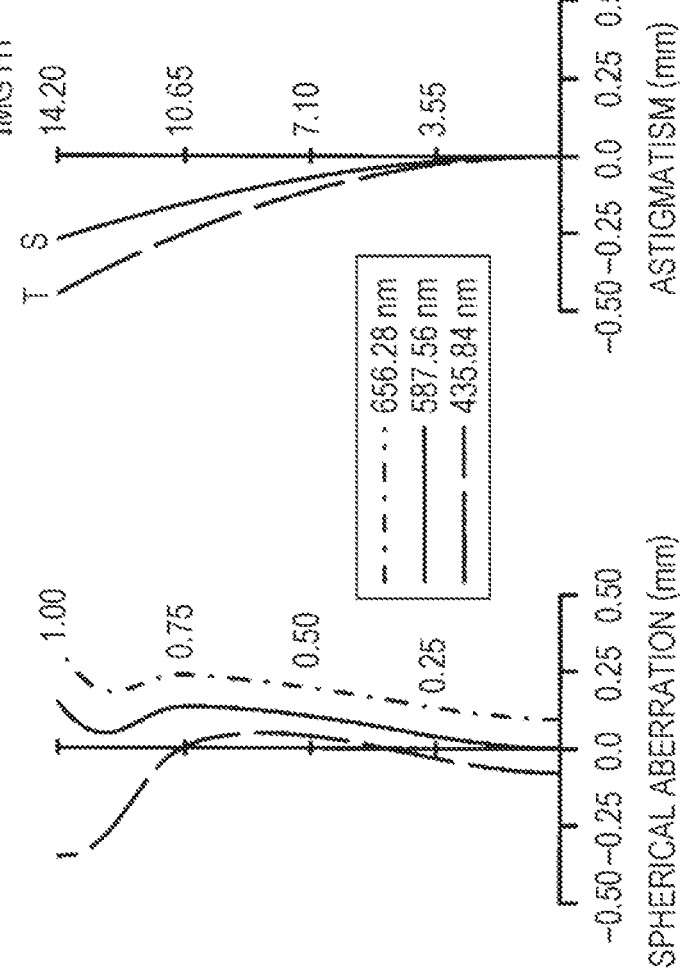

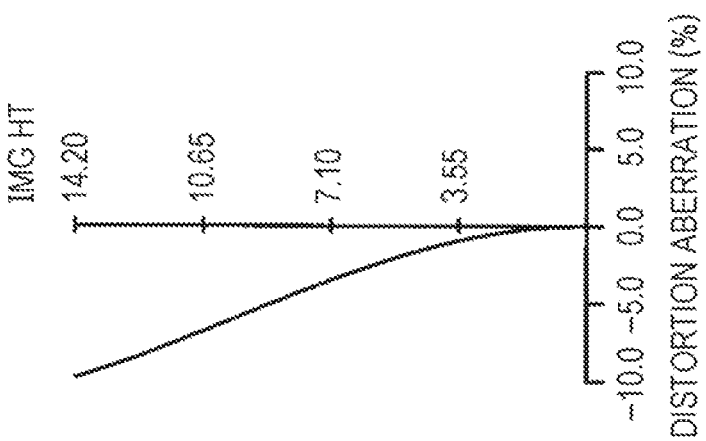
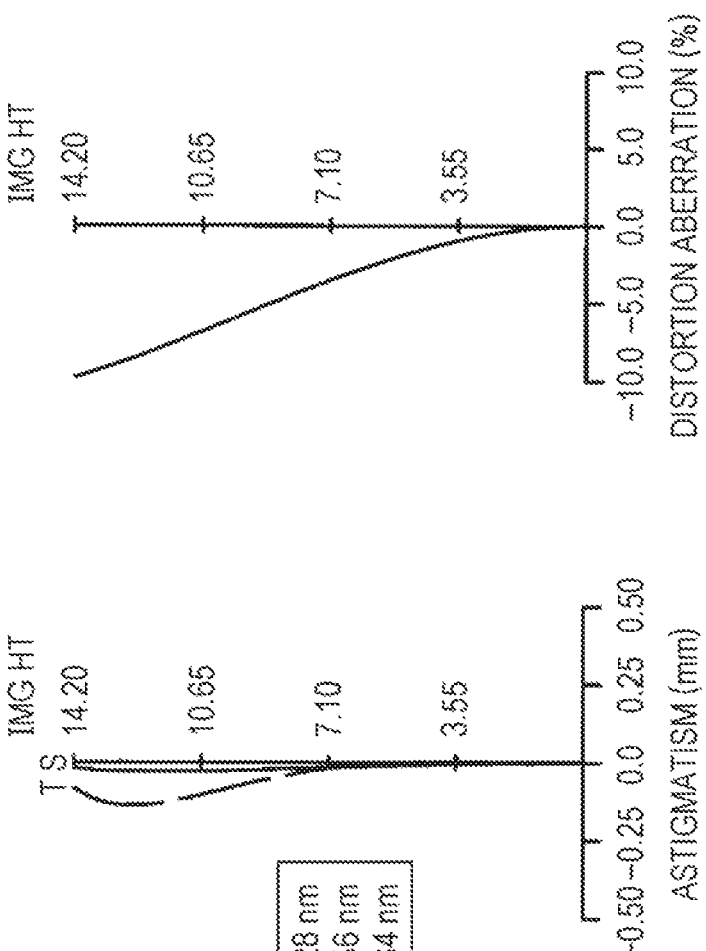
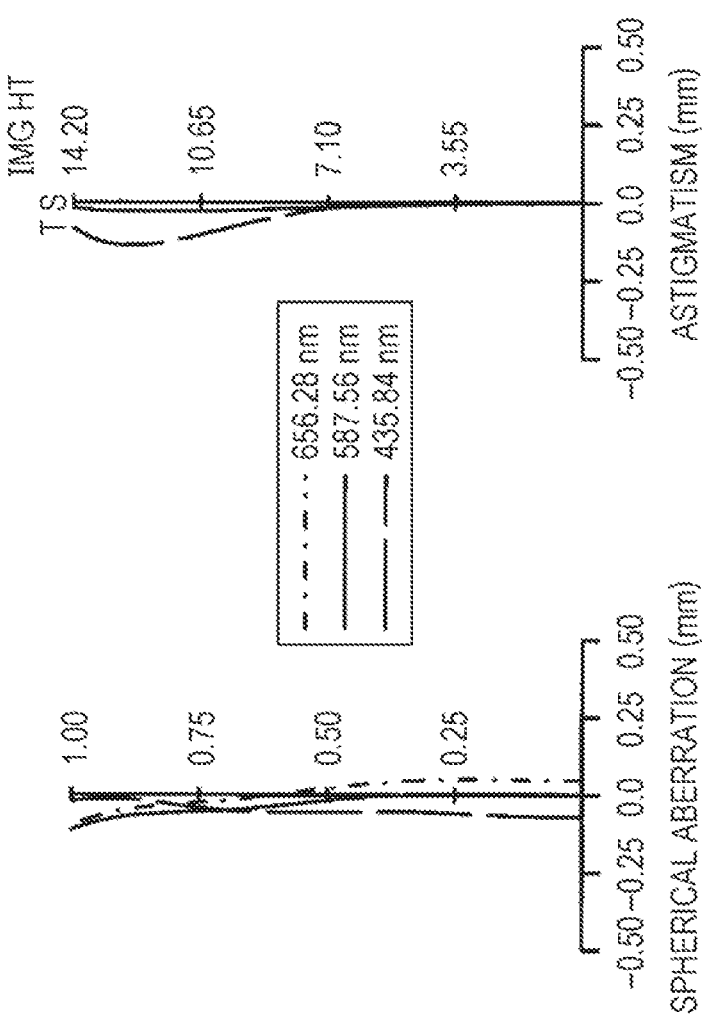

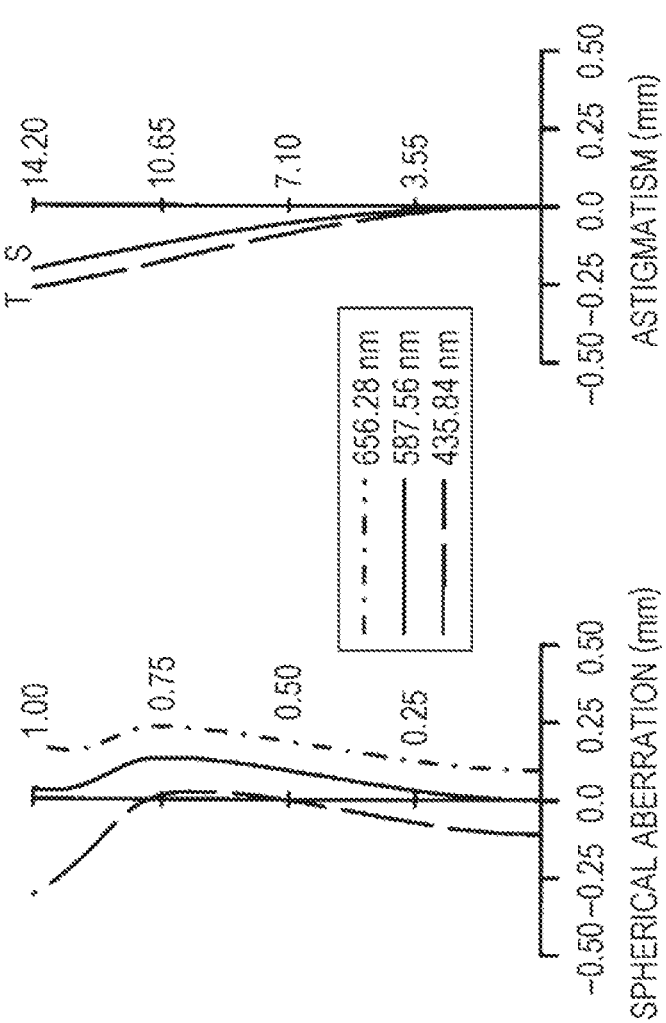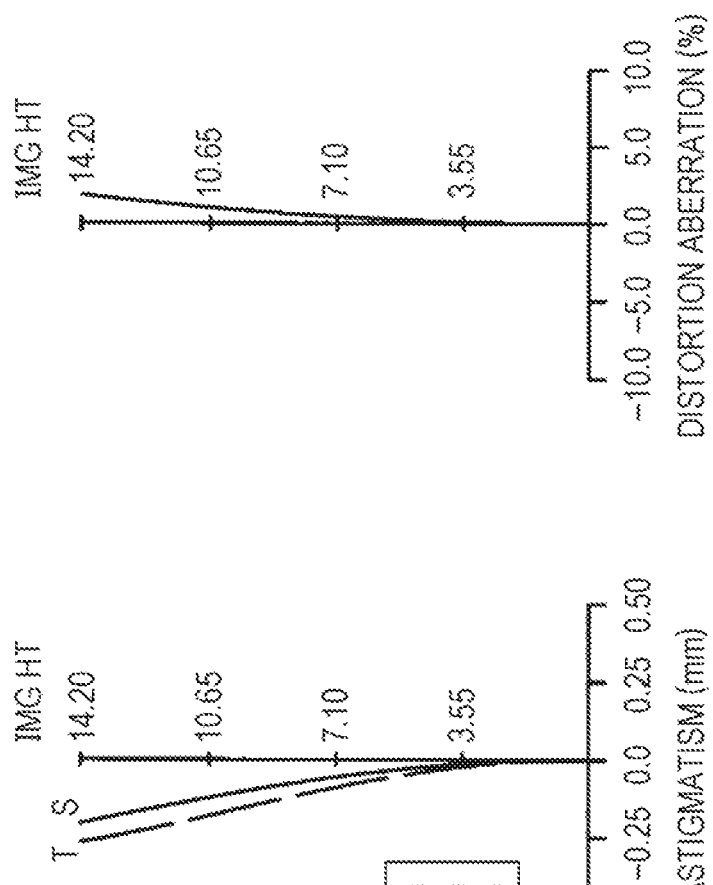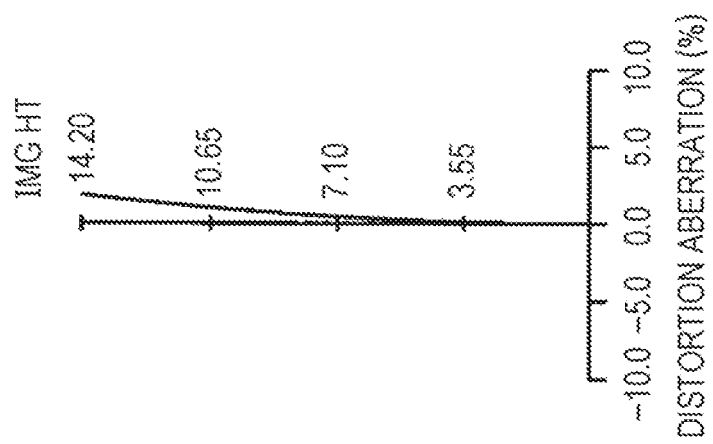

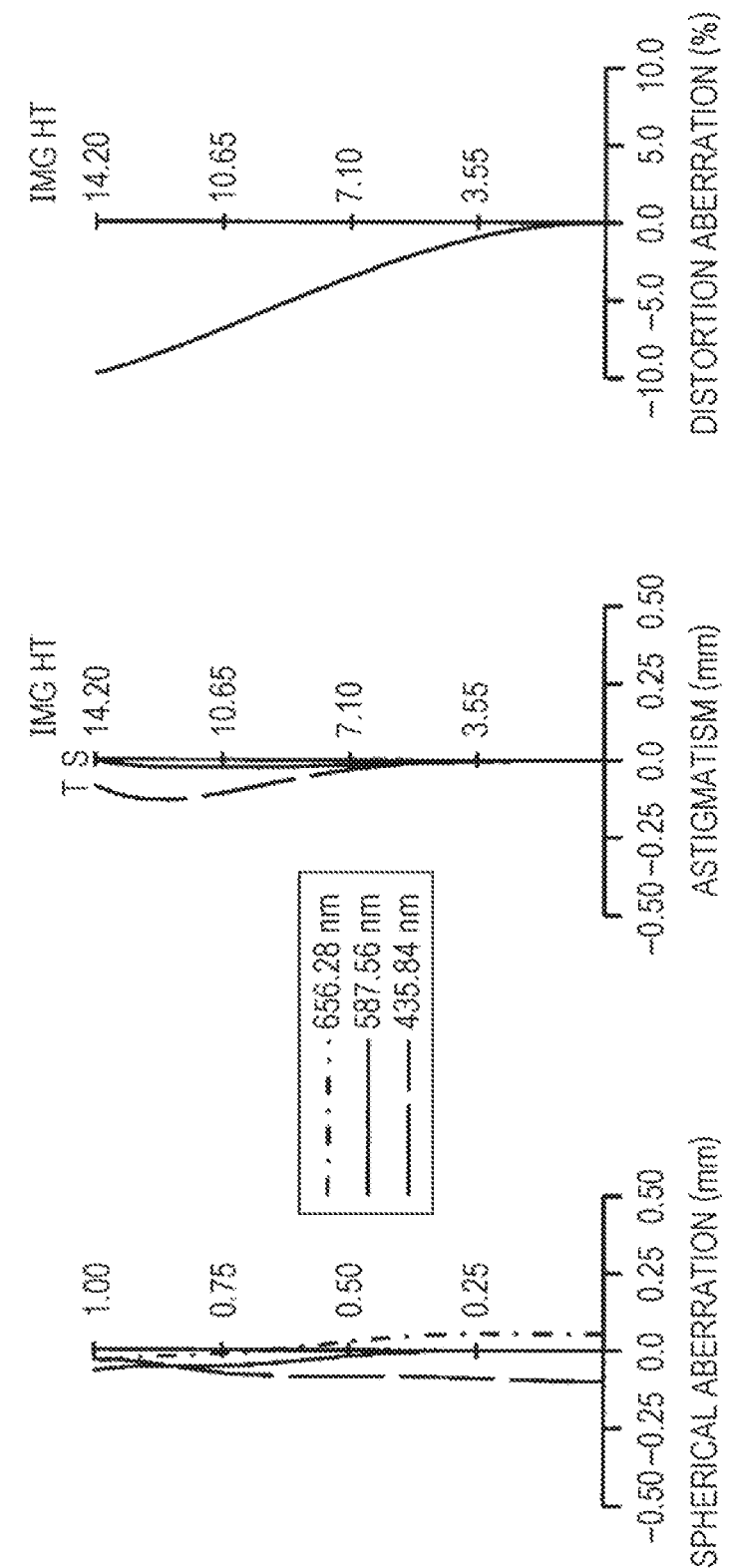

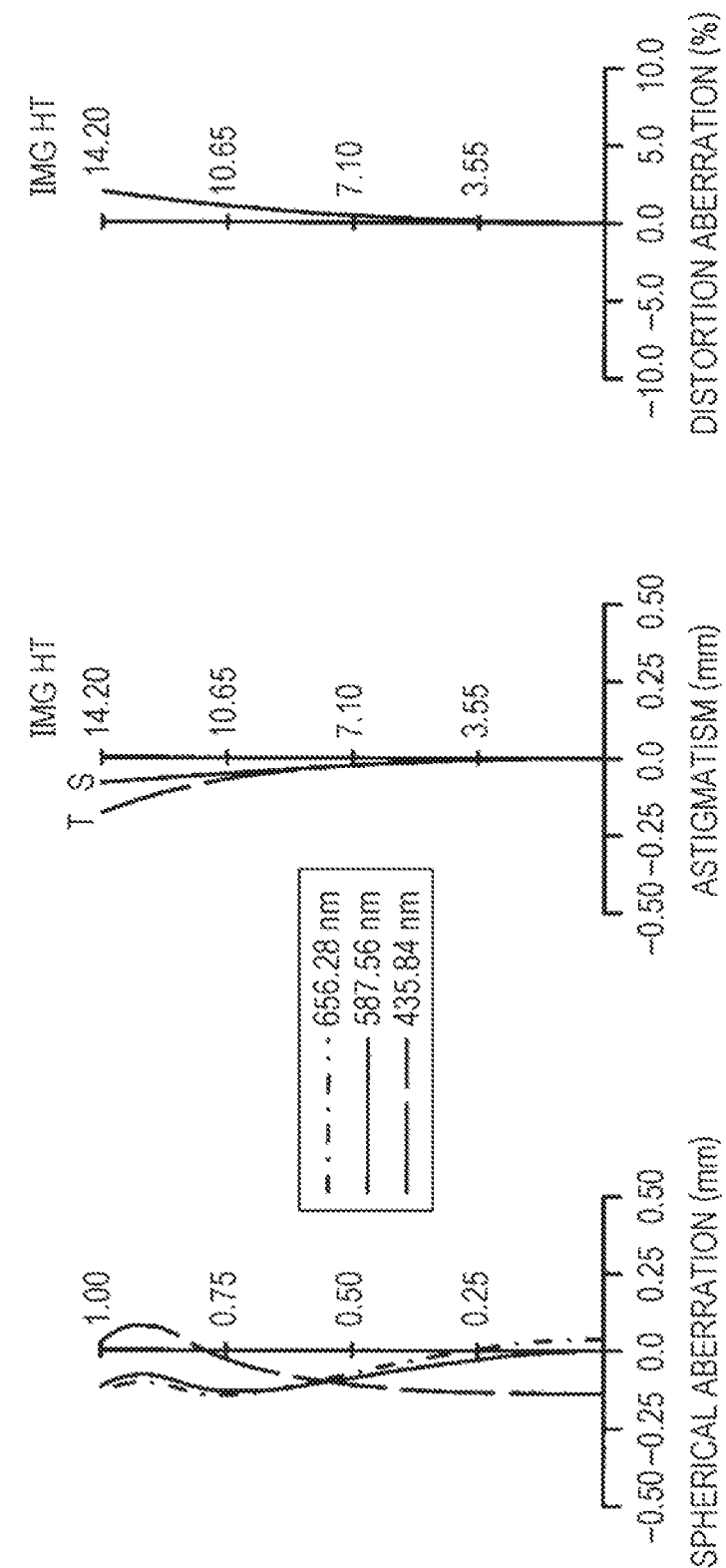

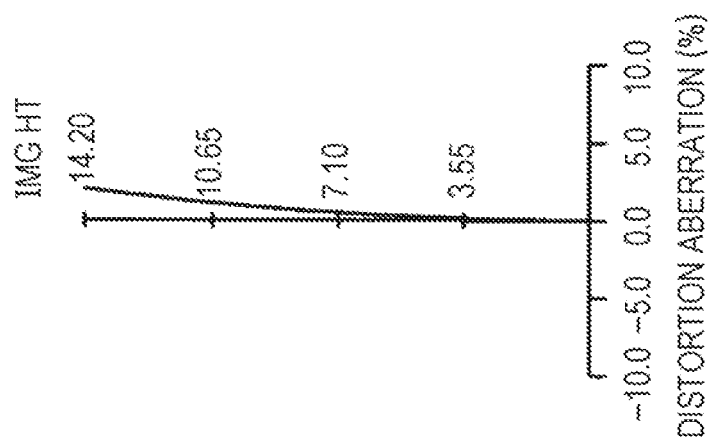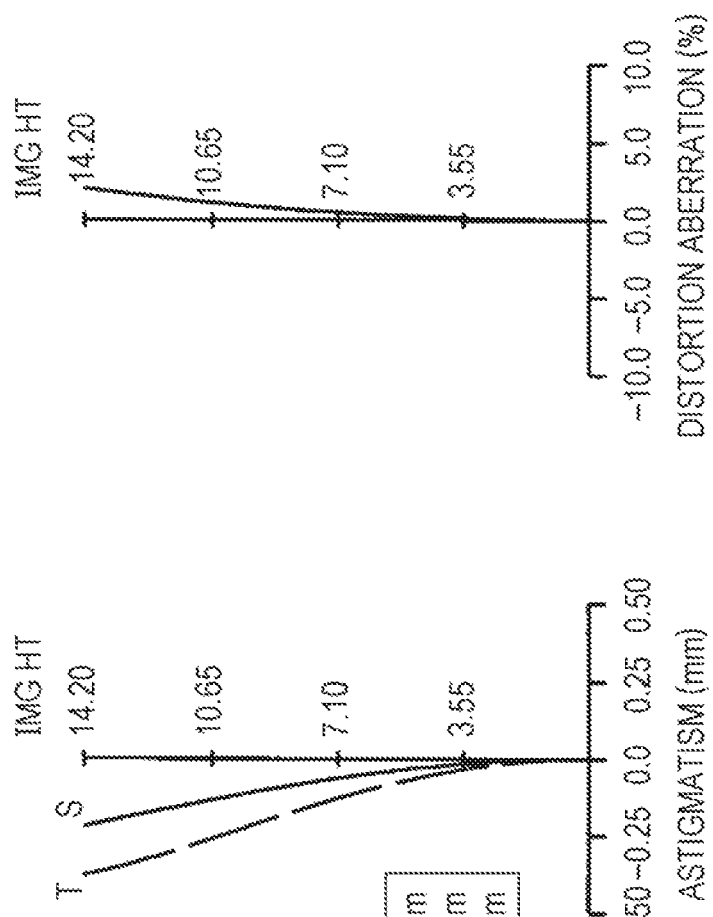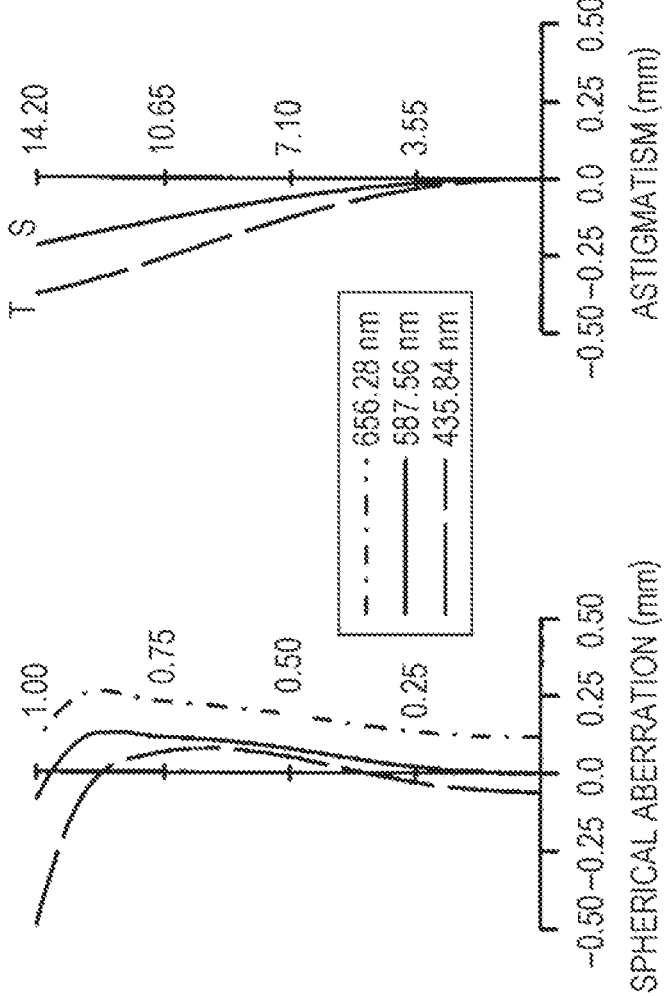

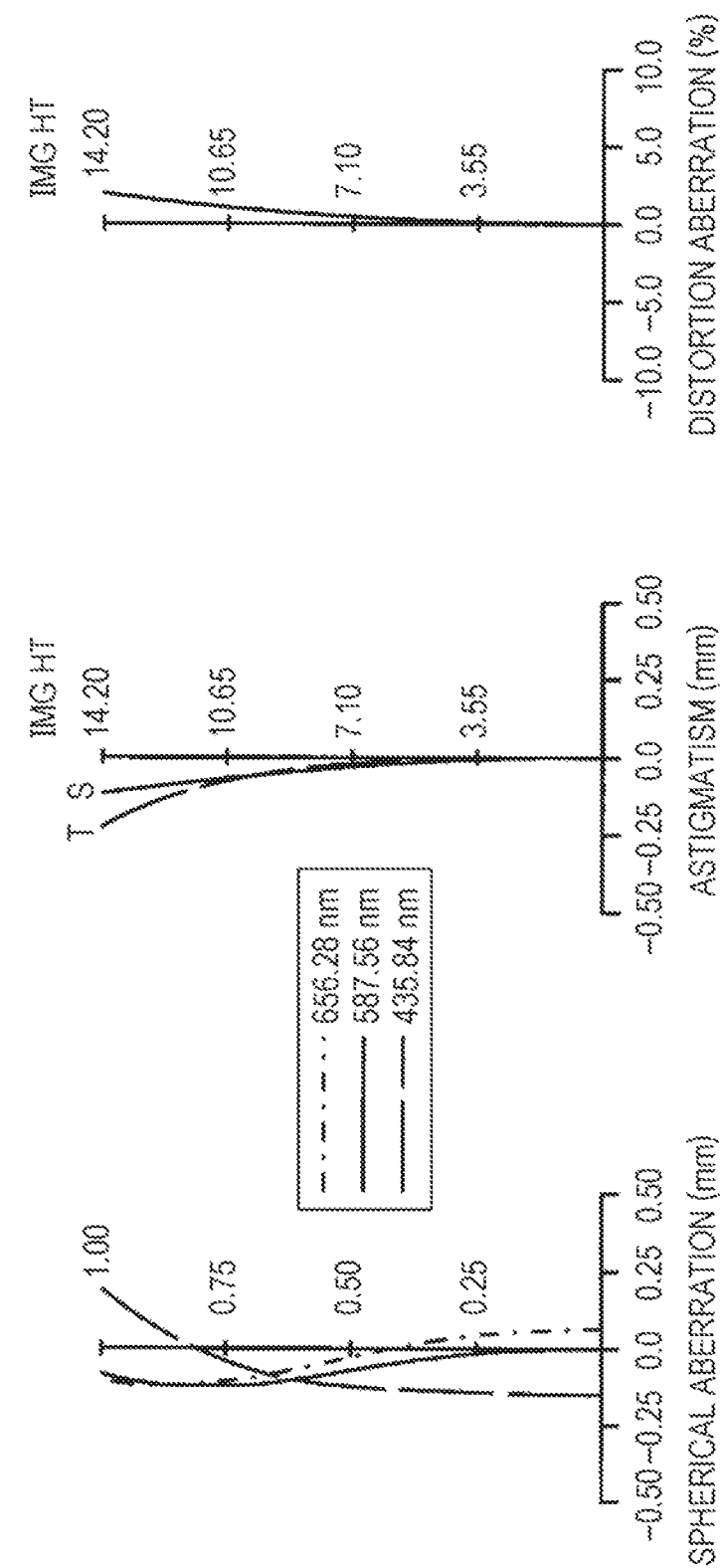

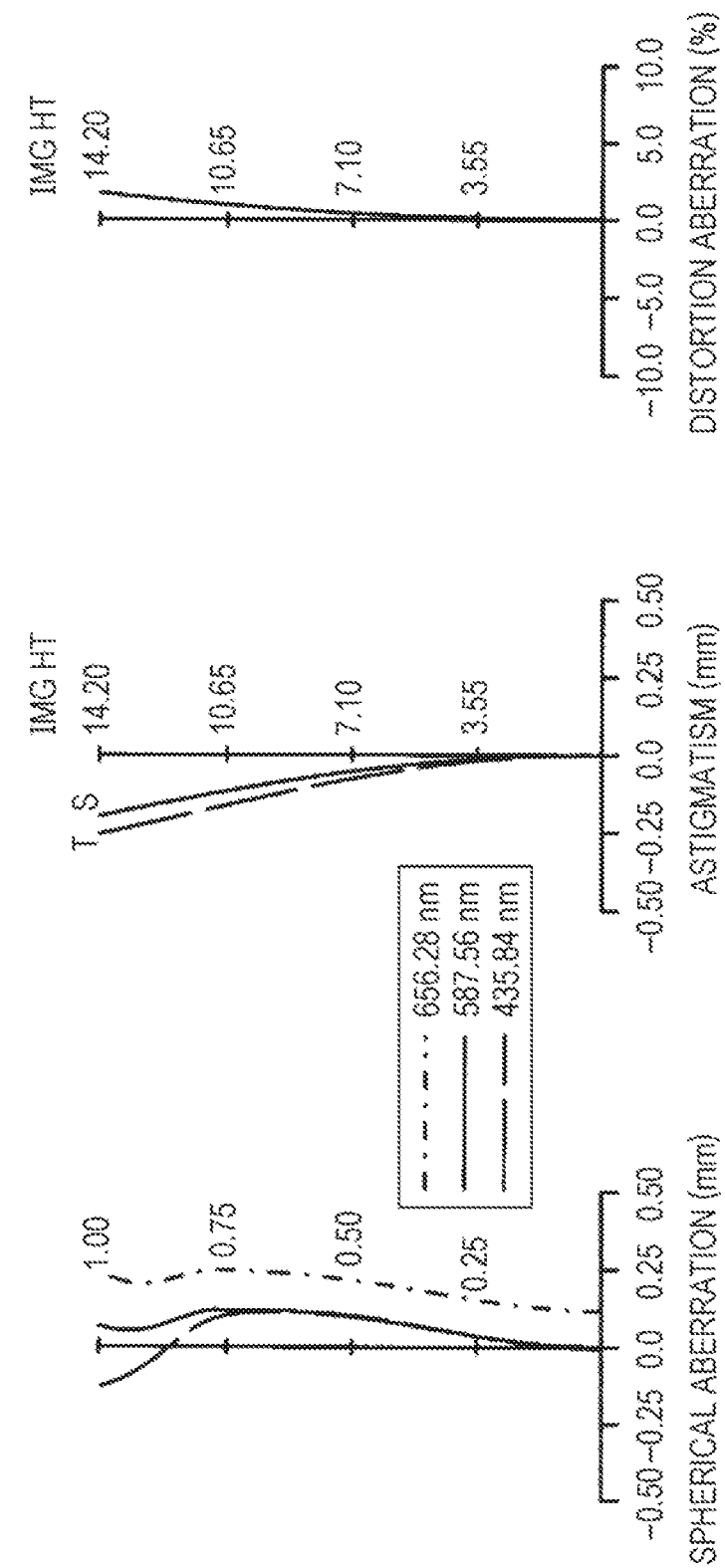

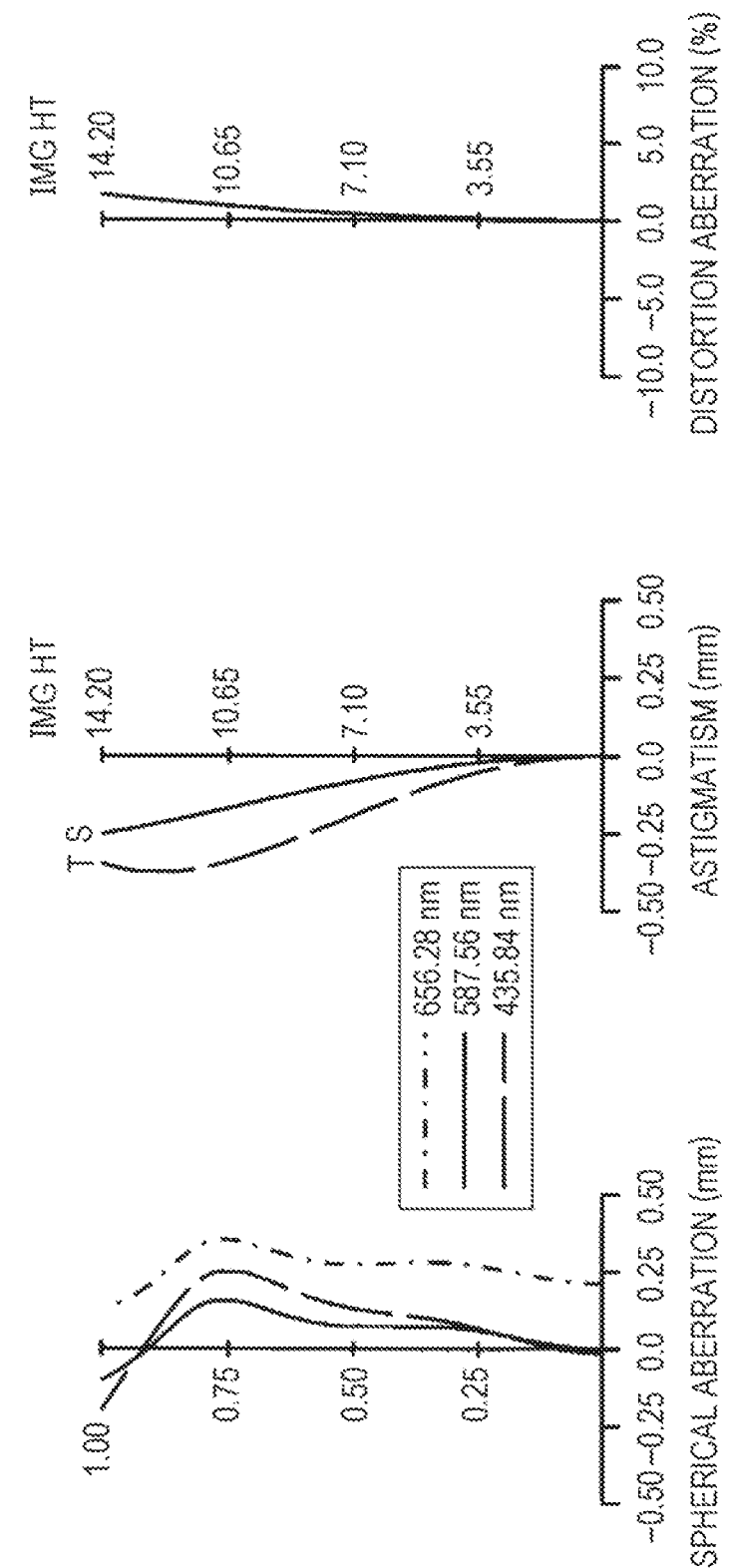

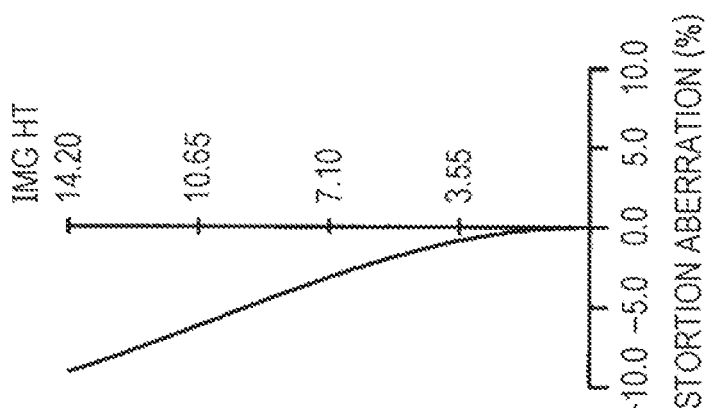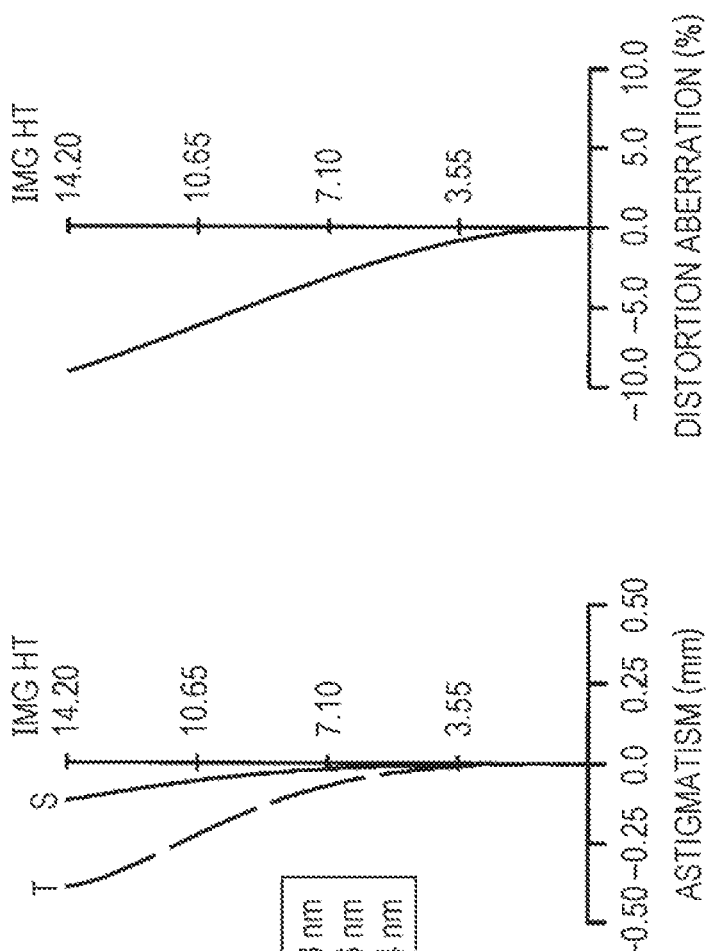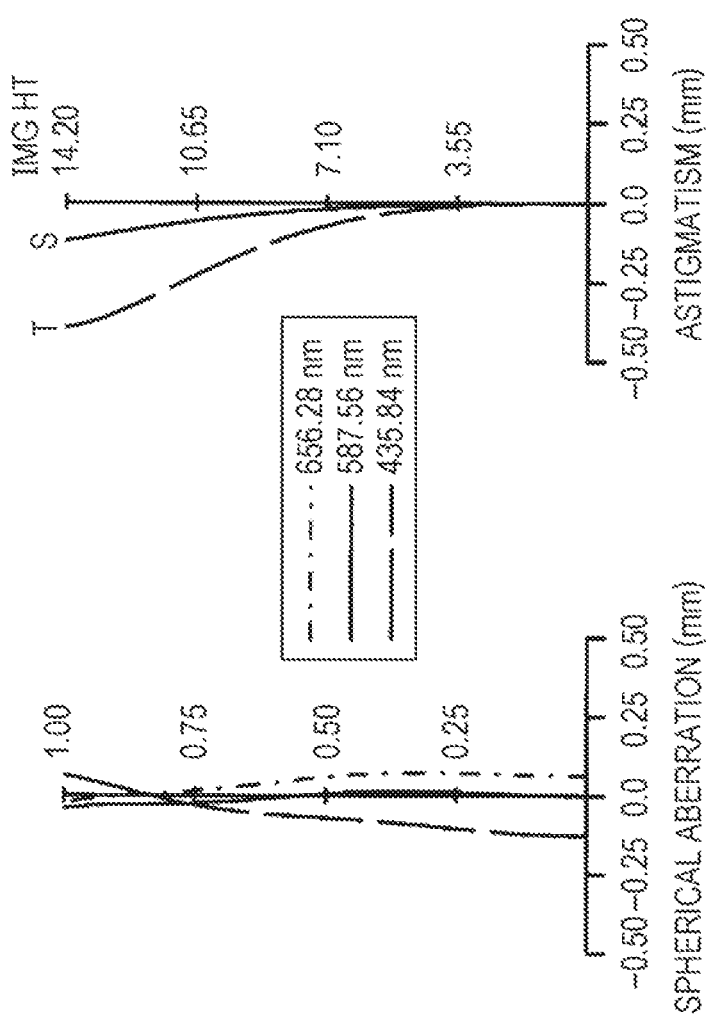

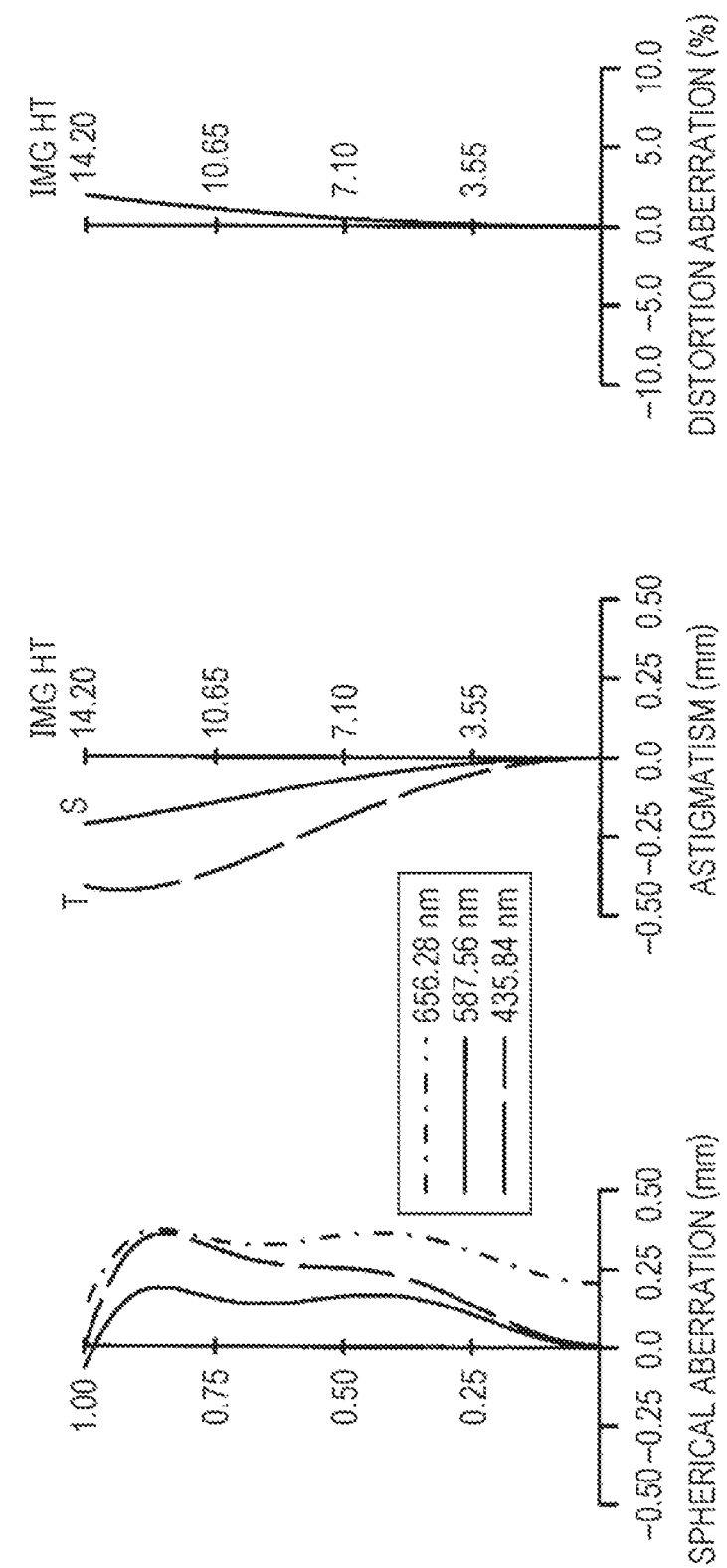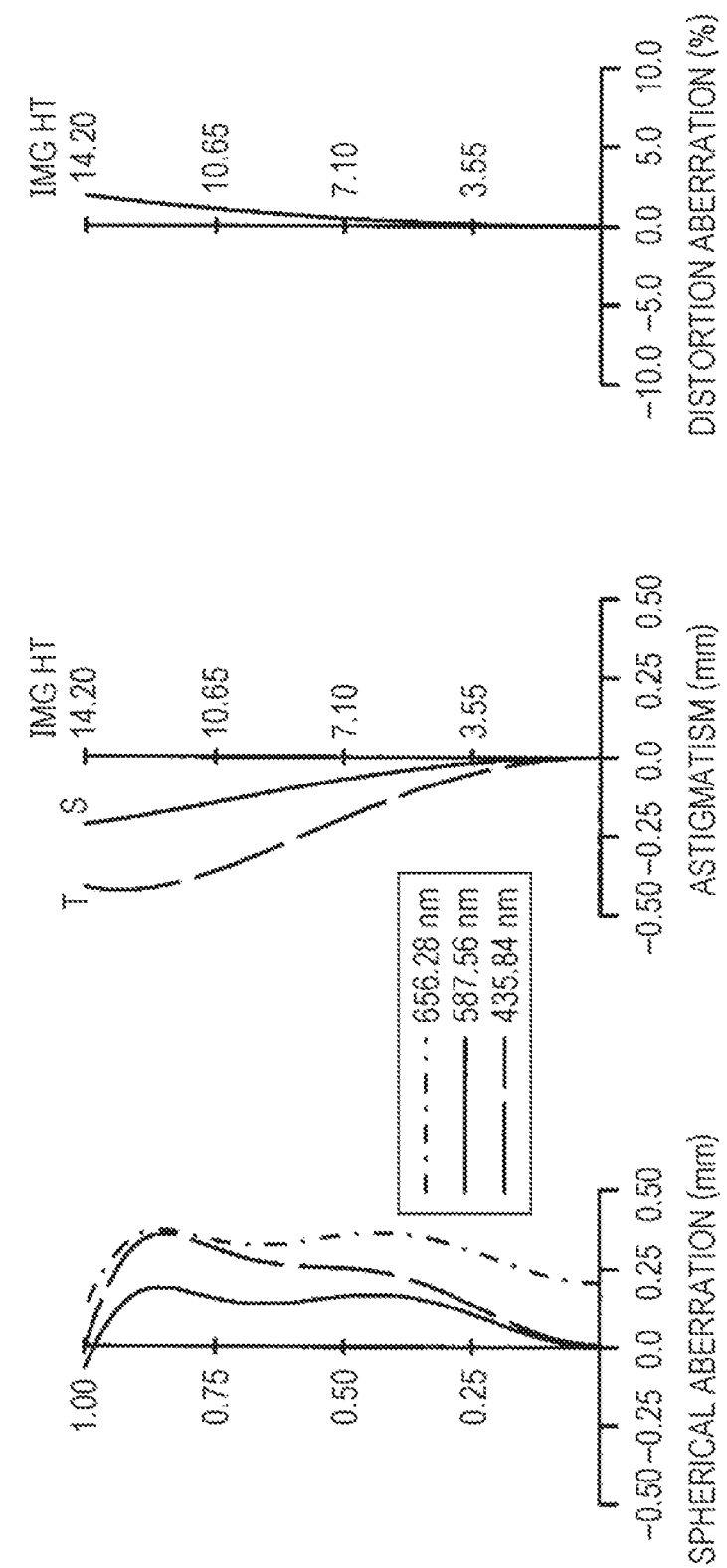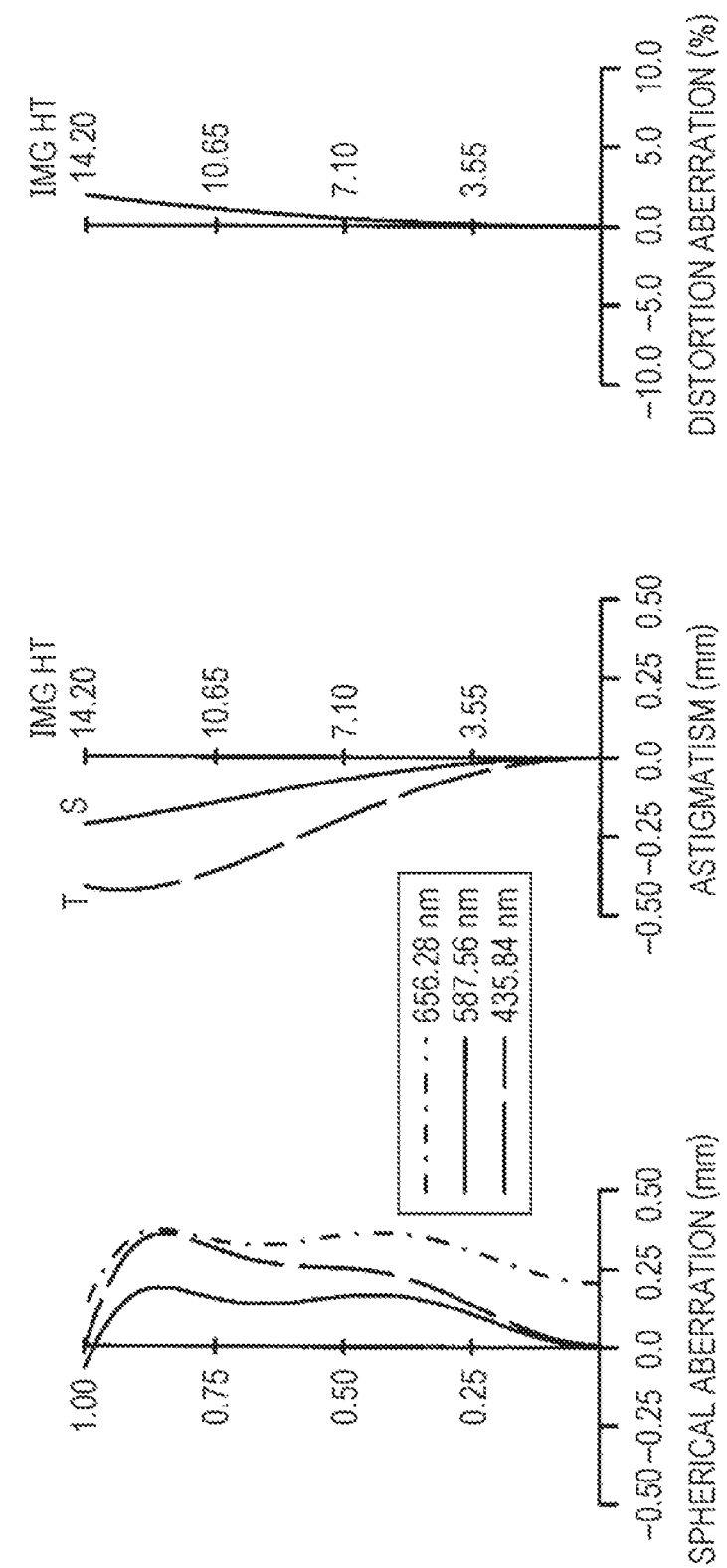

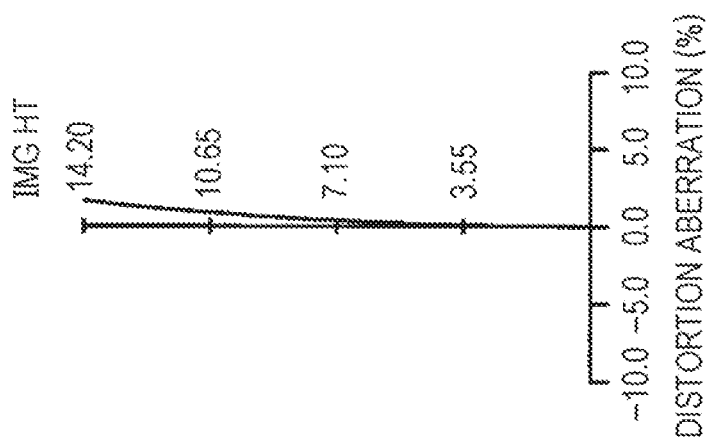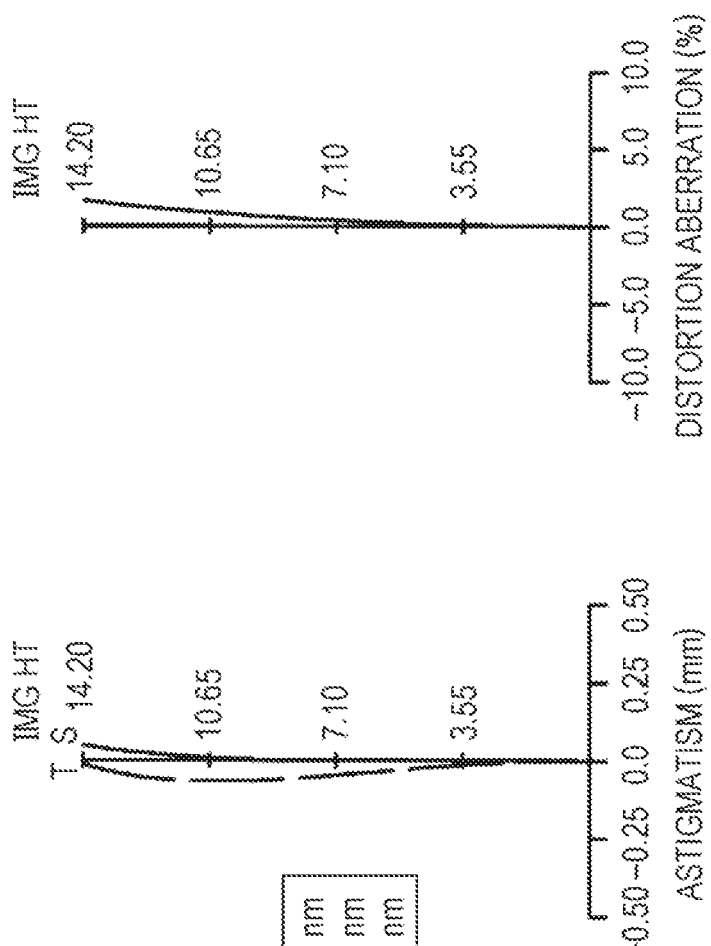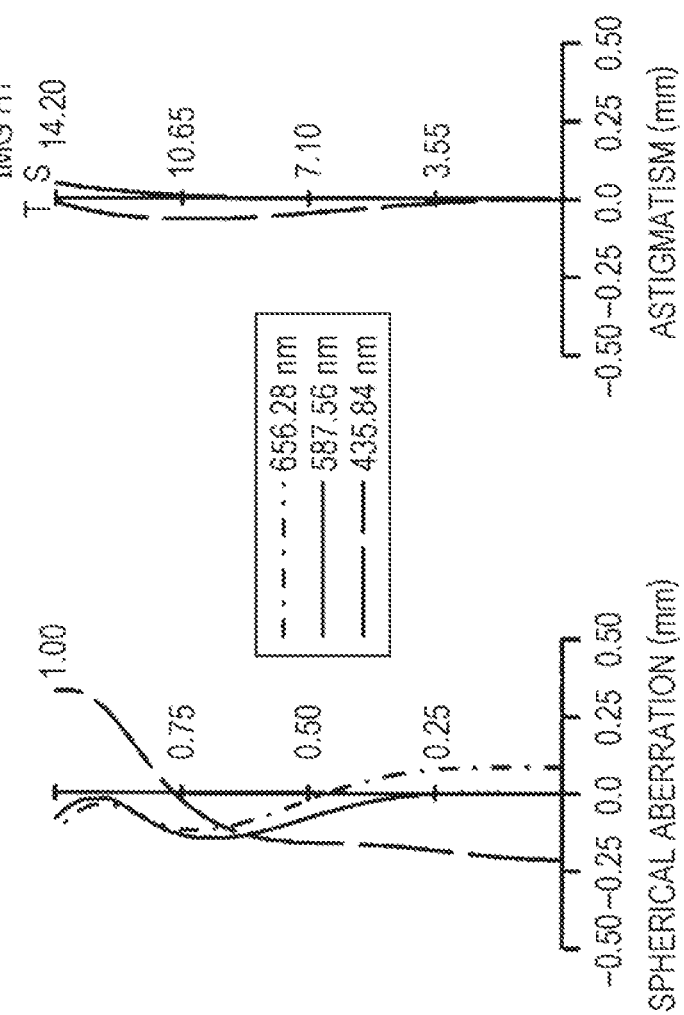

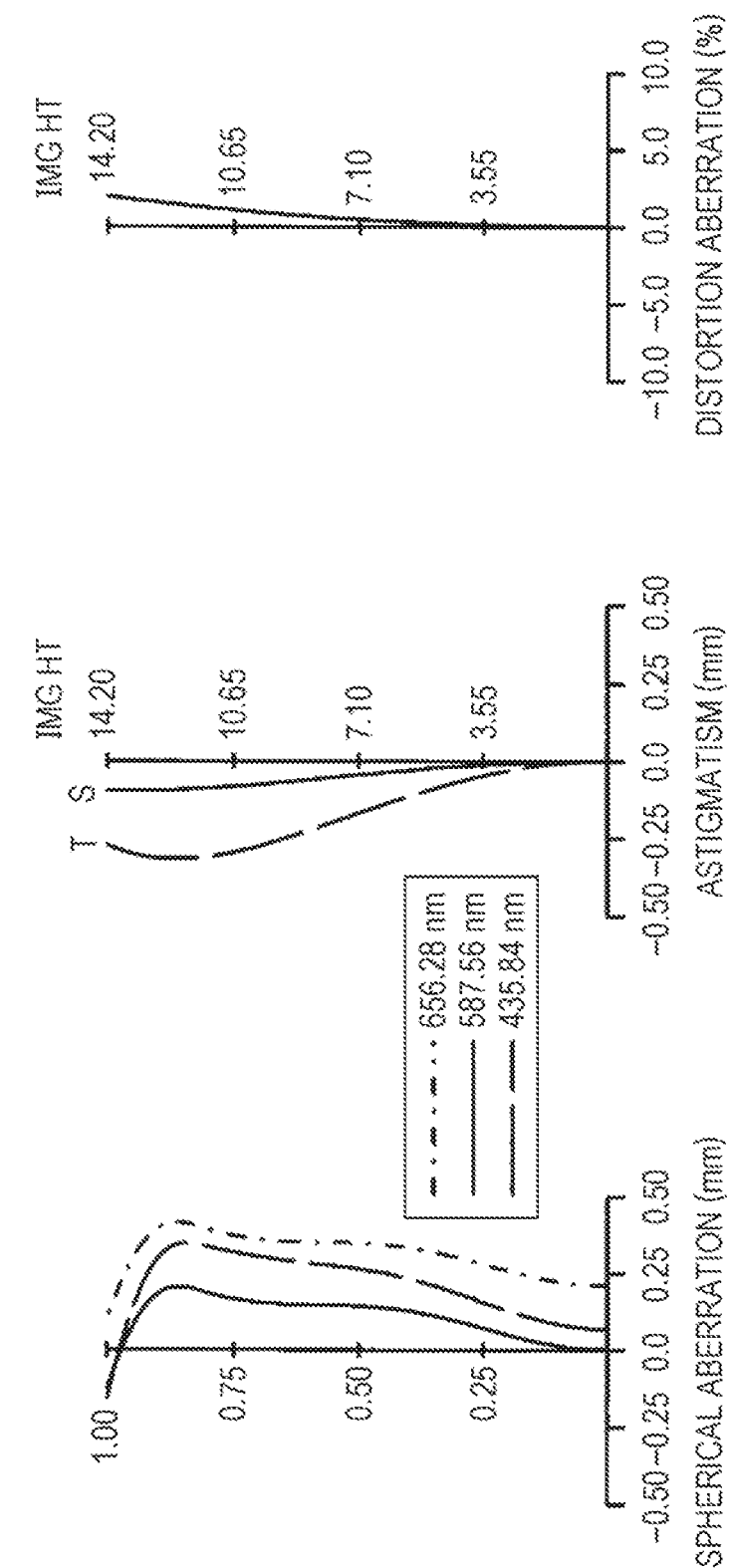

ZOOM LENS, IMAGING OPTICAL DEVICE, AND DIGITAL DEVICE

The entire disclosure of Japanese patent Application No. 2018-214509, filed on Nov. 15, 2018, is incorporated herein by reference in its entirety.

BACKGROUND

Technological Field

The present invention relates to a zoom lens, an imaging optical device, and a digital device, and specifically relates to, for example, an imaging zoom lens having a high zoom ratio, an imaging optical device that outputs an image of a subject captured by the zoom lens and an image sensor as electrical signals, and a digital device having an image input function, such as a digital camera equipped with the imaging optical device.

Description of the Related Art

In recent years, there have been increasing demands for zoom lenses that have achieved features such as miniaturization, wide angle, high zoom ratio, and high resolution. In order to meet such demands, for example, zoom lenses achieving a high zoom ratio have been proposed in JP 2017-116645 A and JP 2010-198012 A.

Recent digital cameras capture not only still images but also moving images using autofocus. In capturing a moving image, it is necessary to constantly keep the moving object in focus, and for this purpose, control is performed to move the focusing lens group by causing the focusing lens group to vibrate (or wobble) at high so as to constantly obtain the maximum contrast value. An increase in the weight of the focusing lens group might increase the load on an actuator, making it difficult to reduce the noise. This would cause the driving sound of the actuator to be recorded at the time of capturing the moving image, leading to a hindrance in capturing the moving image.

Even though the zoom lens described in JP 2017-116645 A has a sufficiently wide angle of view and a high zoom ratio, this zoom lens performs focusing in a range from an object at infinity to an object at close proximity using a heavy second lens group, and thus, not suitable for capturing a moving image. Furthermore, the zoom lens described in JP 2010-198012 A has not achieved a sufficient level of wide angle at its wide angle end.

Summary

The present invention has been made in view of such a situation, and aims to provide a zoom lens that achieves miniaturization and a sufficient zoom ratio while having an angle of view exceeding 70° at the wide angle end and that includes a lightweight focus group suitable for capturing a moving image while suppressing occurrence of aberrations in the entire zoom range, and an imaging optical device and a digital device including the zoom lens.

To achieve the abovementioned object, according to an aspect of the present invention a zoom lens reflecting one aspect of the present invention comprises: in order from an object side, a first lens group having positive refractive power, a second lens group having negative refractive power, a third lens having positive refractive power, a fourth lens group having negative refractive power, a fifth lens group having positive refractive power, and a sixth lens group having negative refractive power, wherein an interval between each of adjacent lens groups varies at zooming, the sixth lens group moves on an optical axis at focusing in a range from an object at infinity to an object at close proximity, and the following conditional expressions (1) and (2) are satisfied:

$$5.7 \leq f1/fw \leq 10.0 \tag{1}$$

$$-3.00 \leq f6/bfw \leq -1.35 \tag{2}$$

where fw is a focal length of an entire system at a wide angle end.

f1 is the focal length of the first lens group, f6 is the focal length of the sixth lens group, and bfw is a back focus at the wide angle end.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 8A to 8I are aberration diagrams of Example 1;

FIGS. 9A to 9I are aberration diagrams of Example 2;

FIGS. 10A to 10I are aberration diagrams of Example 3;

FIGS. 11A to 11I are aberration diagrams of Example 4;

FIGS. 12A to 12I are aberration diagrams of Example 5;

FIGS. 13A to 13I are aberration diagrams of Example 6;

FIGS. 14A to 14I are aberration diagrams of Example 7; and

DETAILED DESCRIPTION OF EMBODIMENTS

Figure 1:
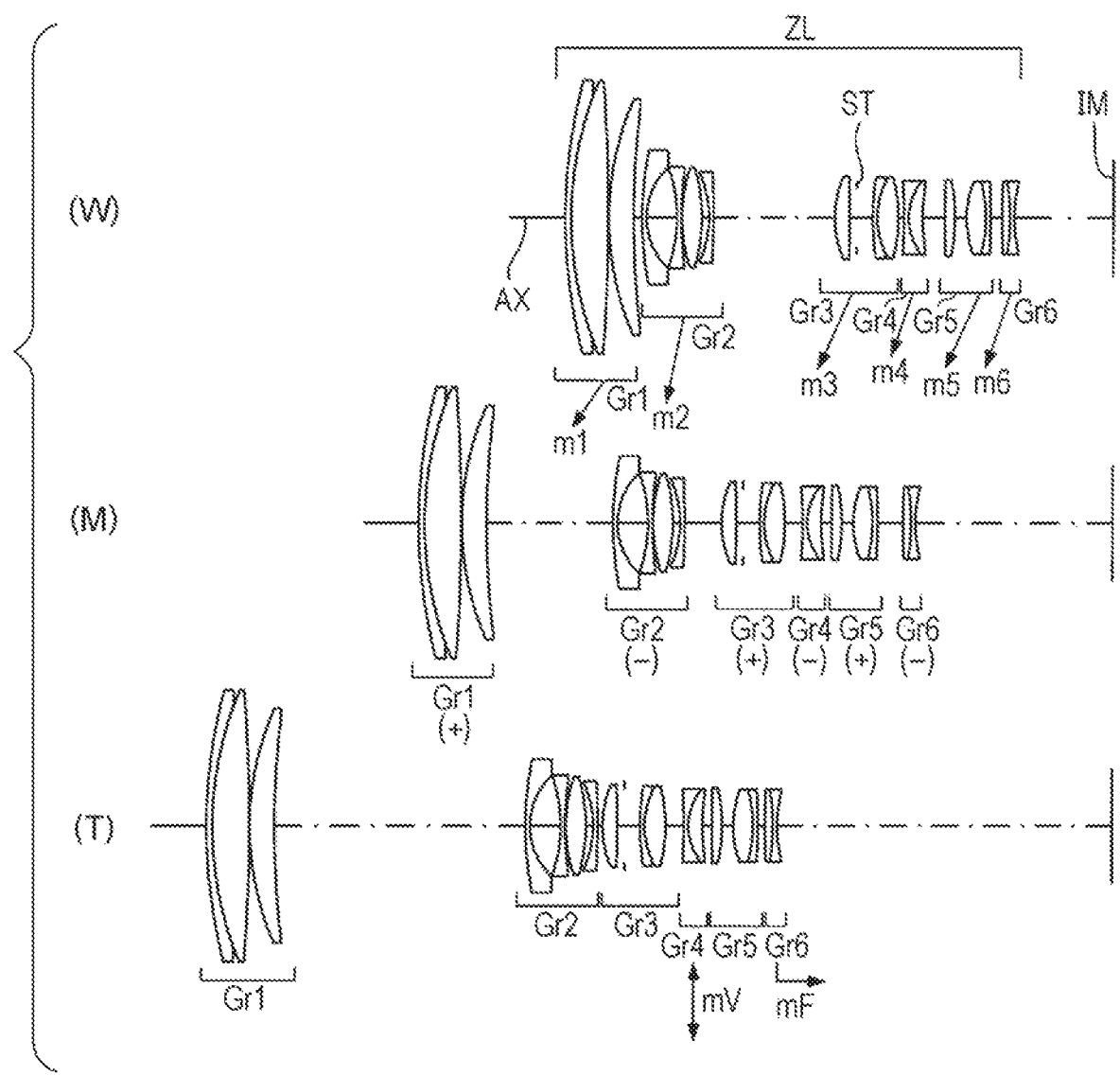
FIG. 1 is an optical configuration diagram according to a first embodiment (Example 1)
Figure 2:
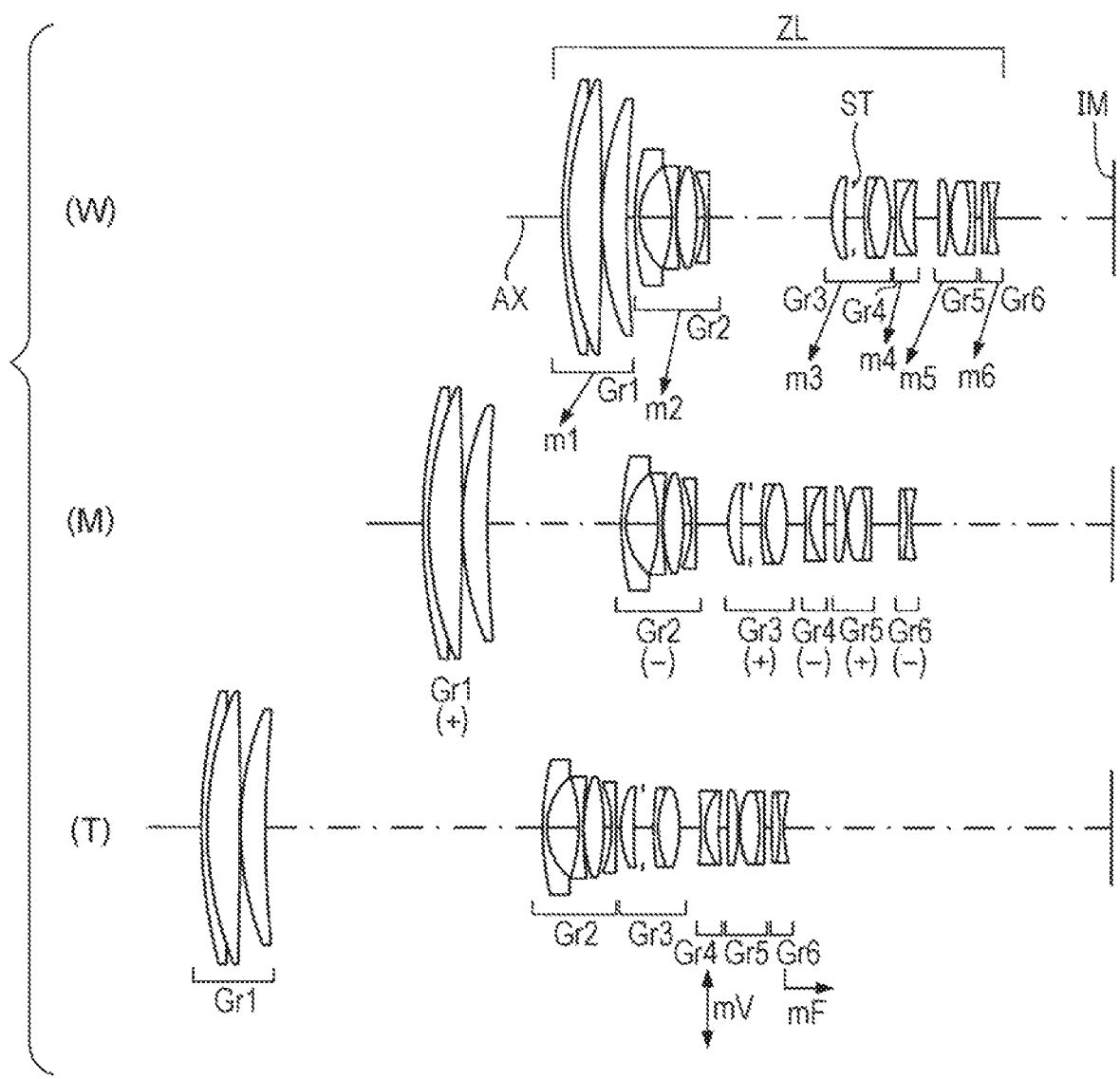
FIG. 2 is an optical configuration diagram according to a second embodiment (Example 2)
Figure 3:
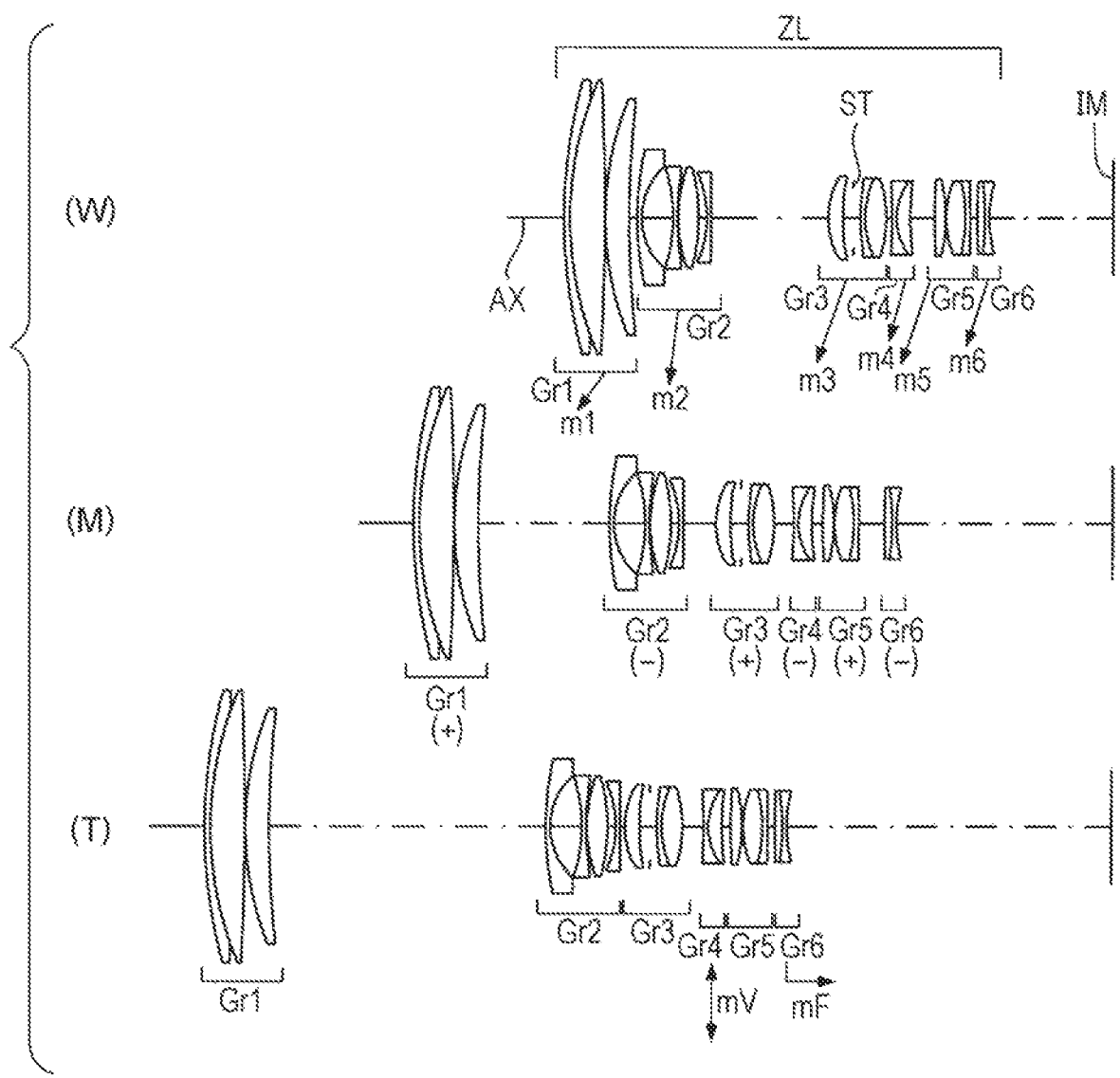
FIG. 3 is an optical configuration diagram according to a third embodiment (Example 3)
Figure 4:
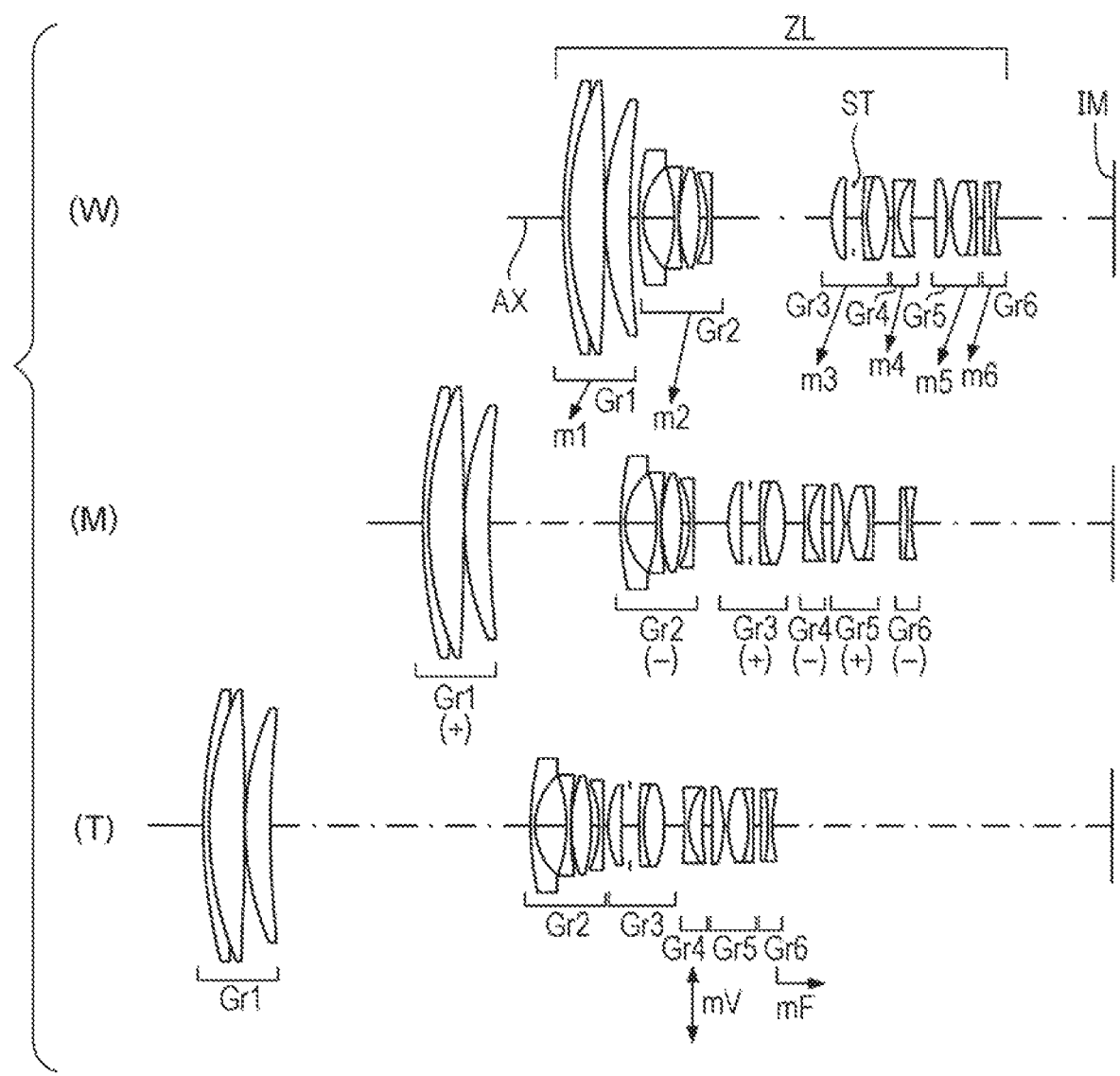
FIG. 4 is an optical configuration diagram according to a fourth embodiment (Example 4)
Figure 5:
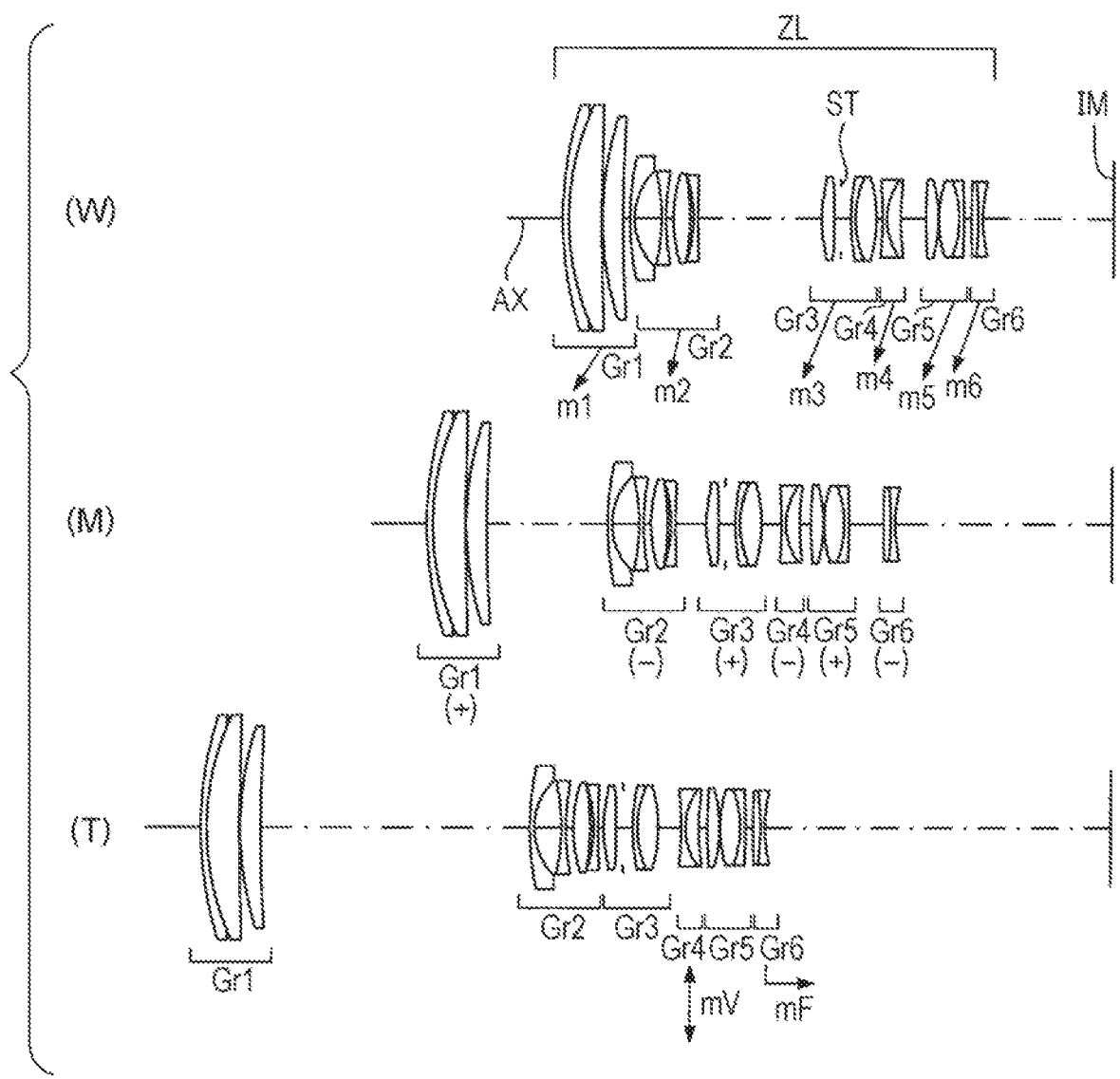
FIG. 5 is an optical configuration diagram according to a fifth embodiment (Example 5)
Figure 6:
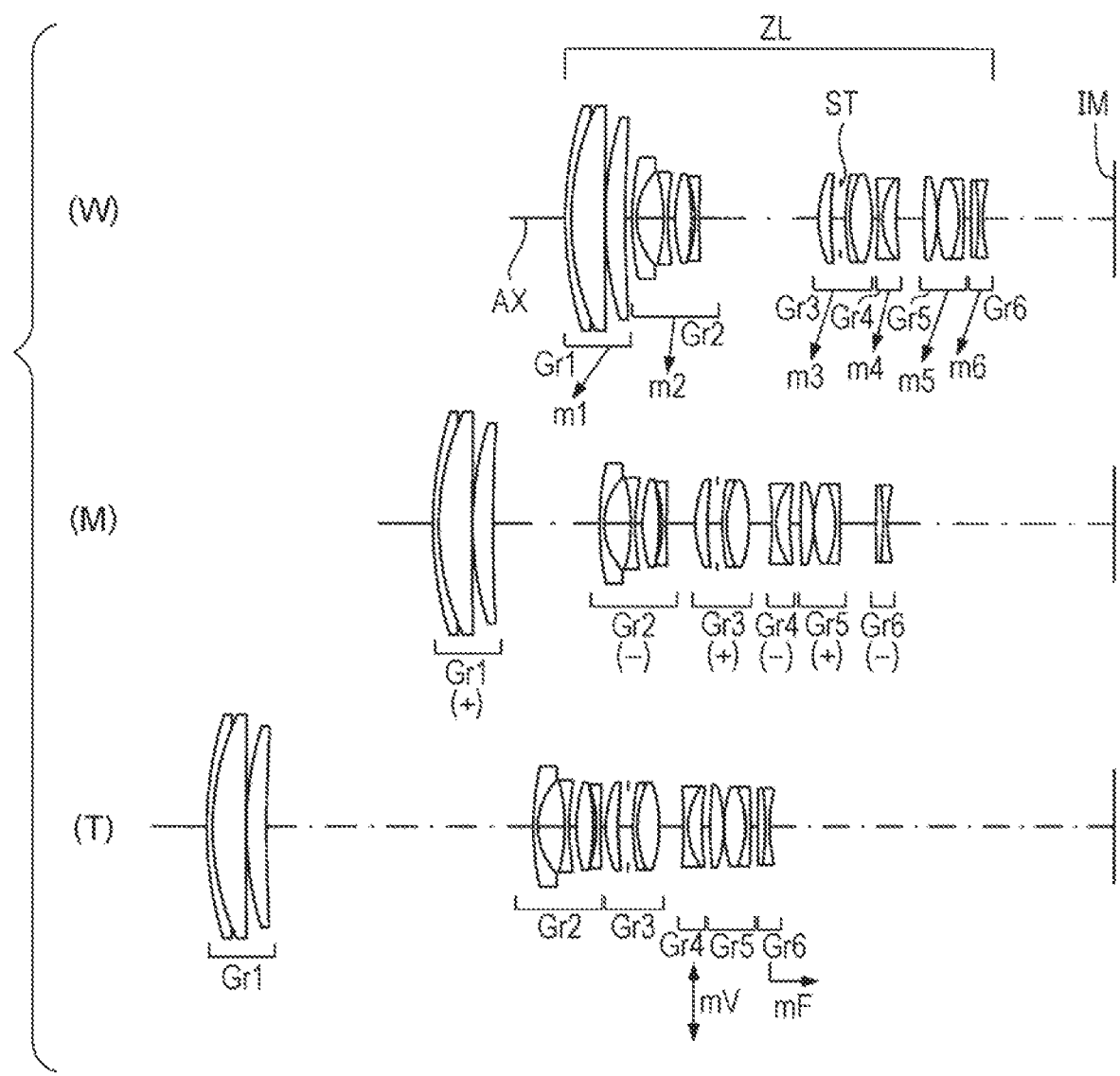
FIG. 6 is an optical configuration diagram according to a sixth embodiment (Example 6)
Figure 7:
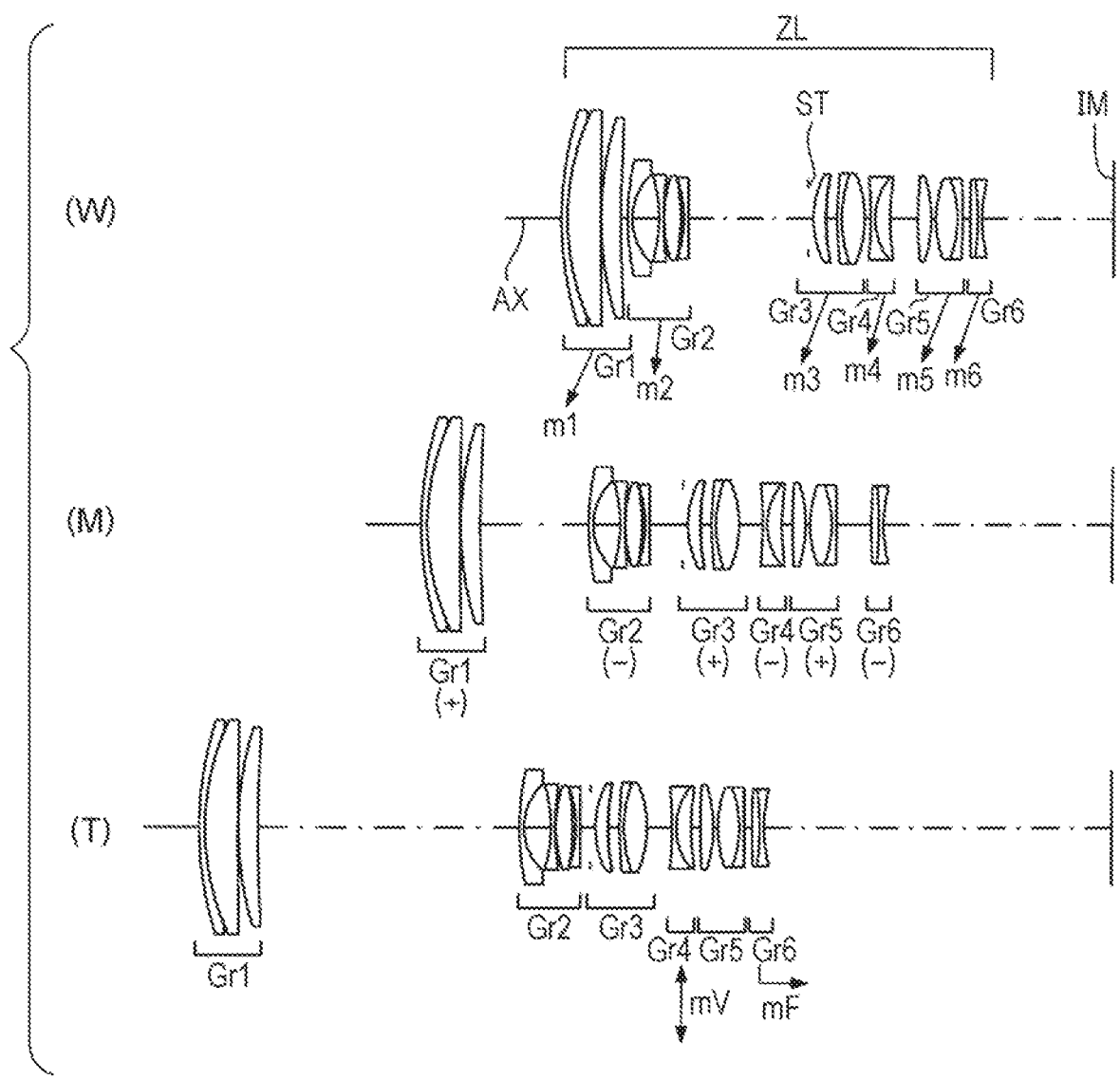
FIG. 7 is an optical configuration diagram according to a seventh embodiment (Example 7)
Figures 9D, 9E, 9F:
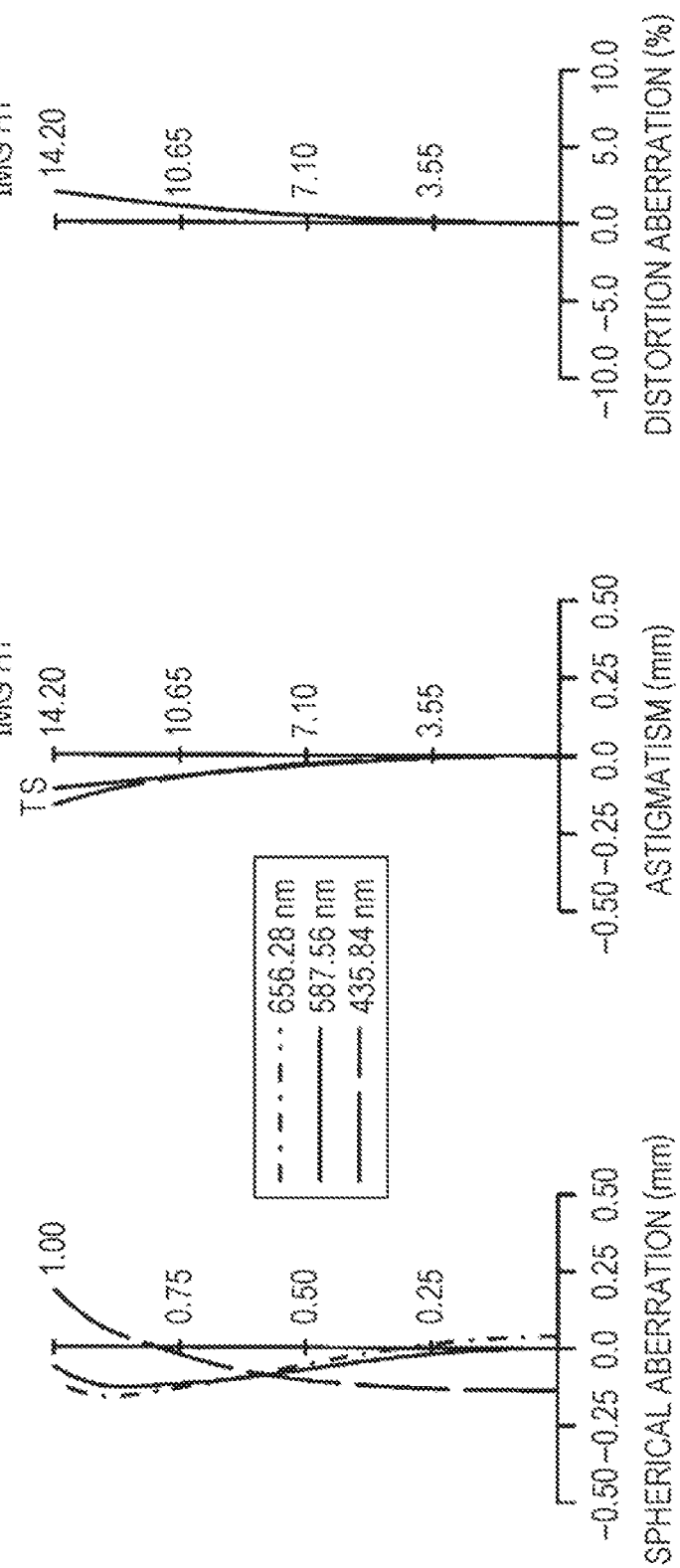
Figures 11A, 11B, 11C:
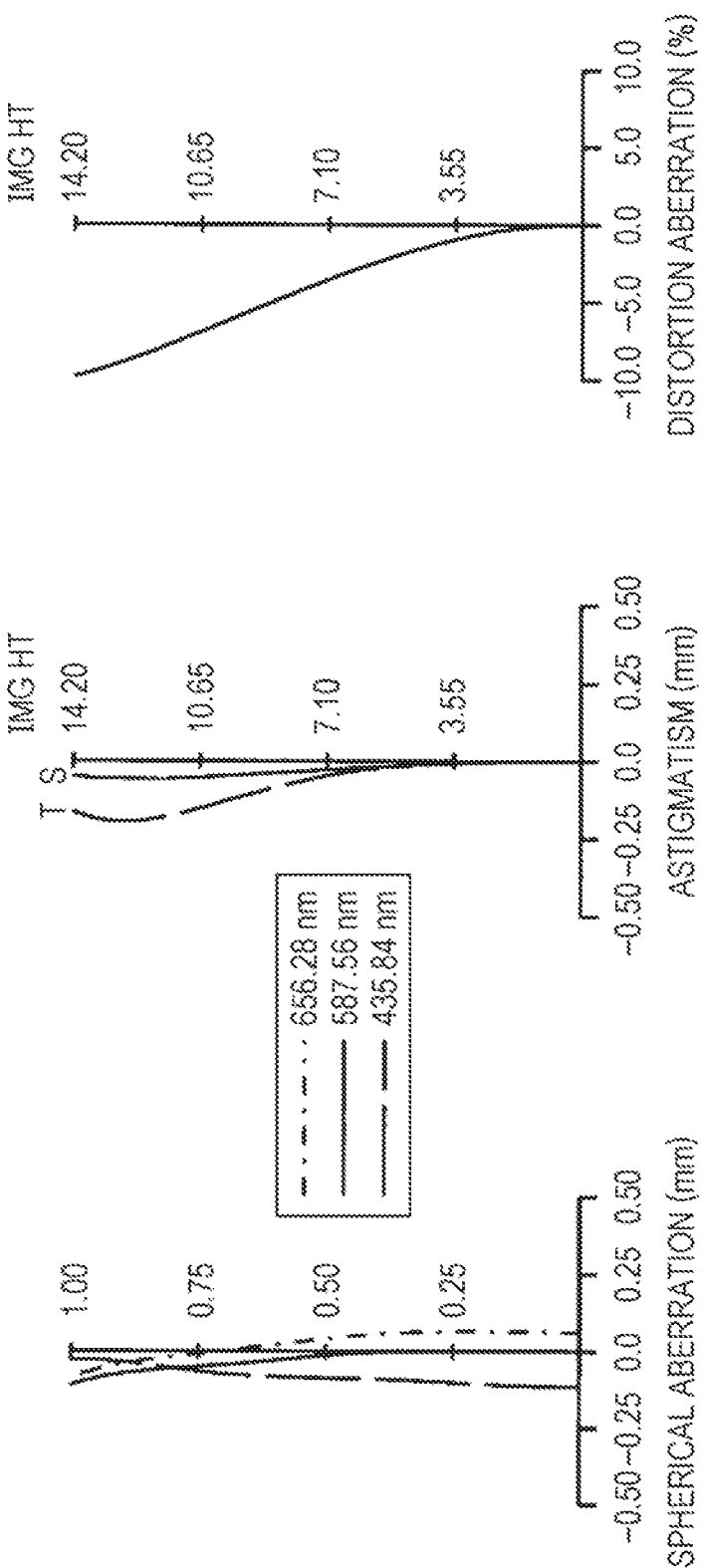
Figure 12A:
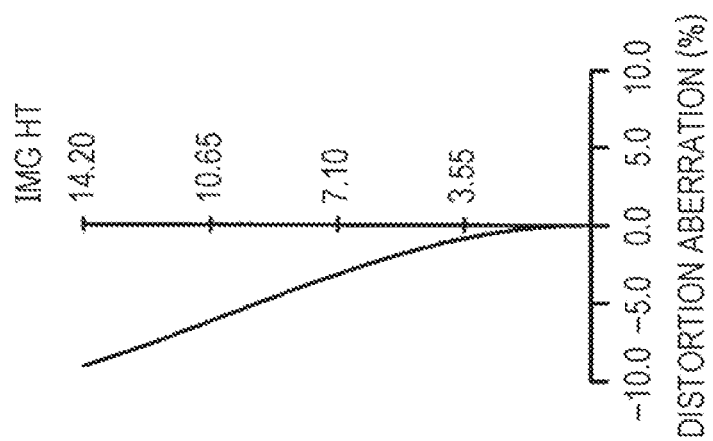
Figure 12B:
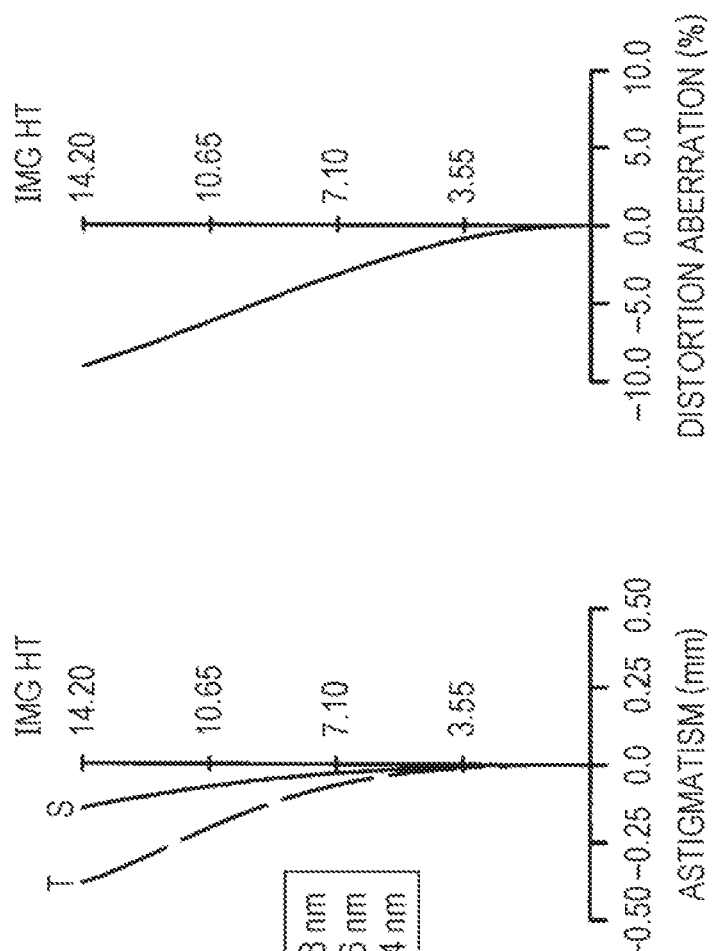
Figure 12C:
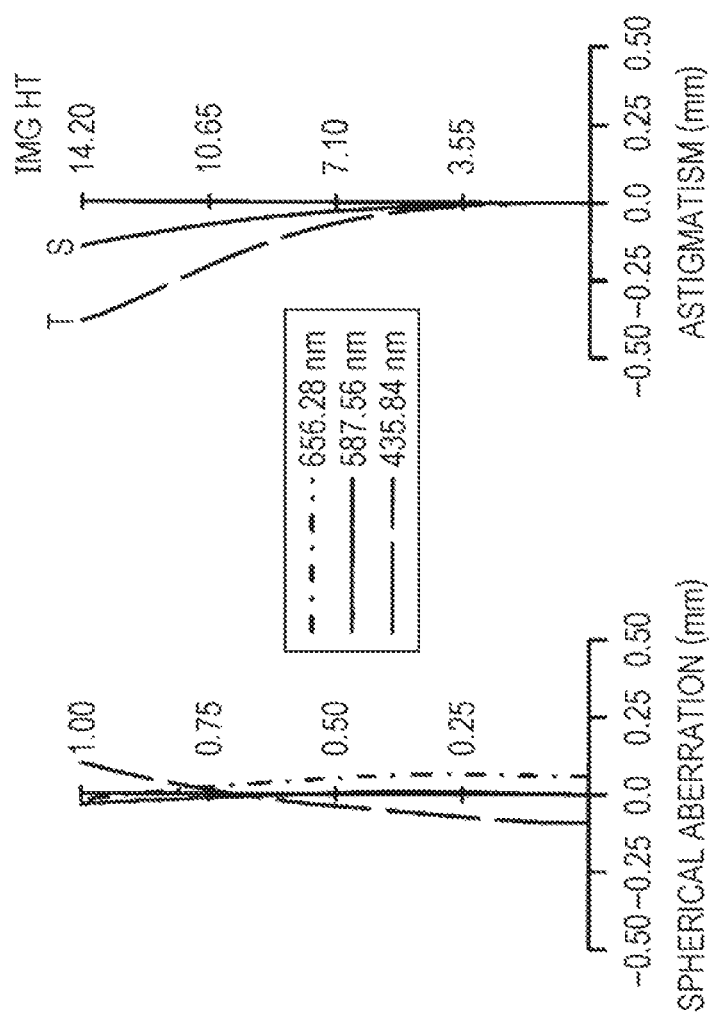
Figures 12D, 12E, 12F:
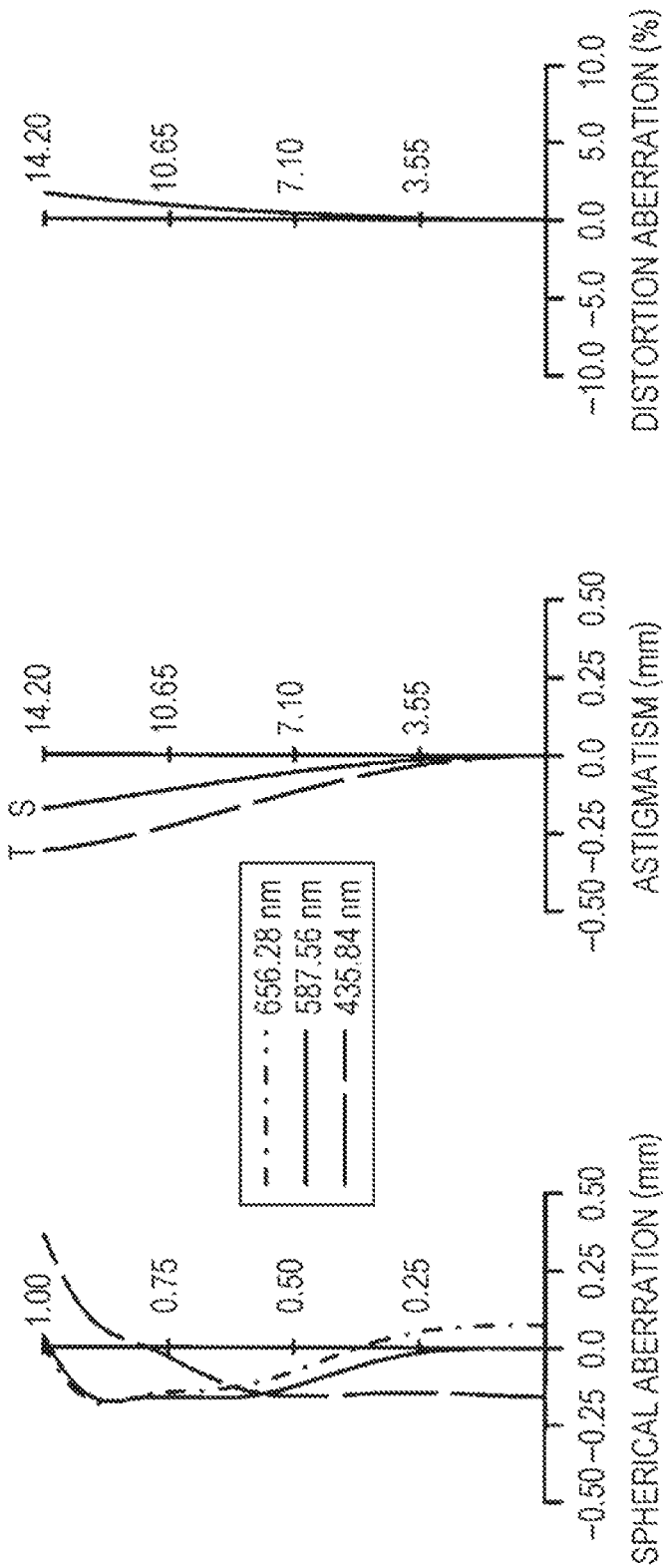
Figures 13D, 13E, 13F:
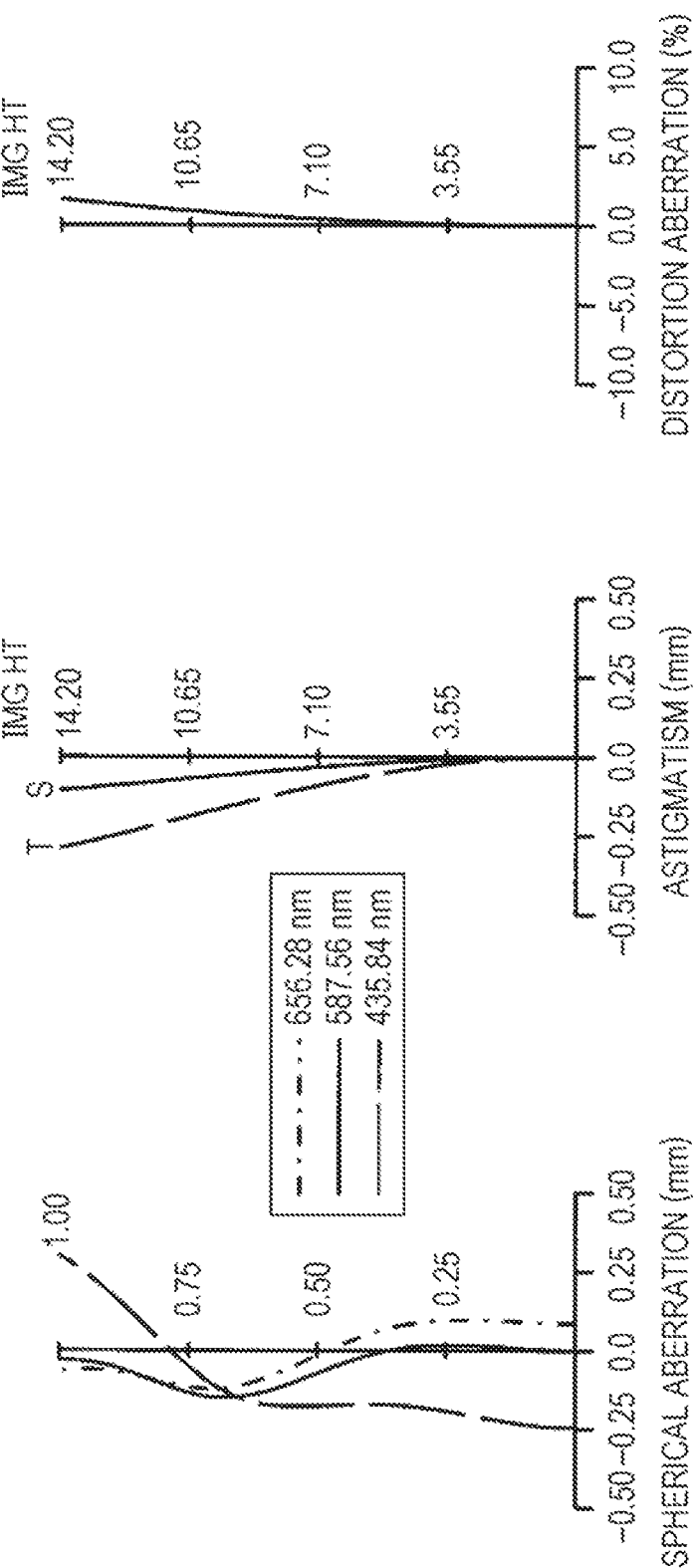
Figure 14A:
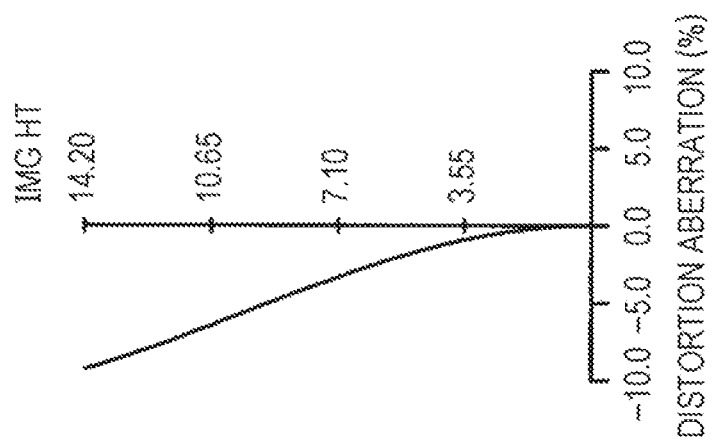
Figure 14B:
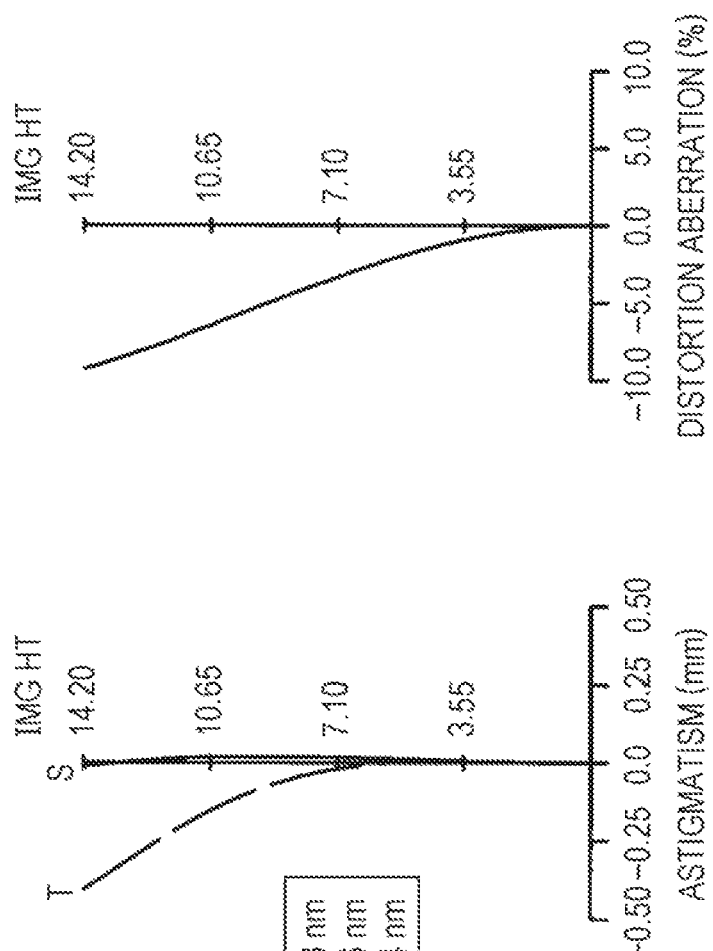
Figure 14C:
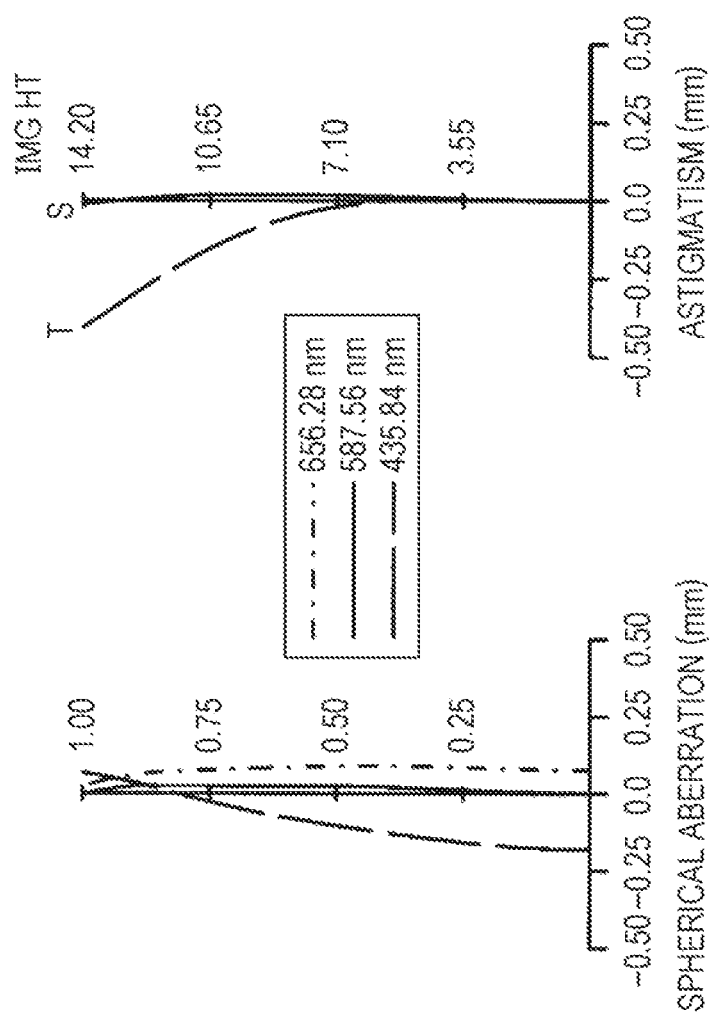

Hereinafter, one or more embodiments of the present invention will be described with reference to the drawings. However, the scope of the invention is not limited to the disclosed embodiments.

Hereinafter, a zoom lens, an imaging optical device, and a digital device according to an embodiment of the present invention will be described. A zoom lens according to an embodiment of the present invention includes, in order from the object side, a first lens group having positive refractive power, a second lens group having negative refractive power, a third lens having positive refractive power, a fourth lens group having negative refractive power, a fifth lens group having positive refractive power, and a sixth lens group having negative refractive power, and has a configuration in which an interval between each of adjacent lens groups varies at zooming and the sixth lens group moves on an optical axis at focusing in a range from an object at infinity to an object at close proximity. In this manner, with a configuration having power arrangement of positive, negative, positive, negative, positive, negative in order from the object side (power: an amount defined by the reciprocal of the focal length) and in which focusing is performed with a miniaturized and lightweight sixth lens group, it is possible to achieve a configuration suitable for capturing a moving image.

The zoom lens characteristically satisfies the following conditional expressions (1) and (2).

$$5.7 \leq f1/fw \leq 10.0 \qquad (1)$$

$$-3.00 \leq f6/bfw \leq -1.35 \qquad (2)$$

where fw is a focal length of the entire system at the wide angle end, f1 is the focal length of the first lens group, f6 is the focal length of the sixth lens group, and bfw is a back focus at the wide angle end.

Conditional expression (1) defines conditions for achieving a wide angle at the wide angle end and properly correcting aberrations over a wide zoom range by appropriately setting the focal length of the first lens group. When the setting is below the lower limit of conditional expression (1), the power of the first lens group becomes so high that spherical aberration and comatic aberration generated in the first lens group would increase particularly at the telephoto end. In order to correct the above aberrations, it might be effective to use a glass material with a high refractive index for the positive lens in the first lens group. On the other hand, a glass material with a high refractive index has a high dispersion, making it difficult to perform correction of axial chromatic aberration. Regarding the angle of view, when the setting is below the lower limit of conditional expression (1), it is difficult to achieve sufficient level of wide angle at the wide angle end. On the other hand, when the setting exceeds the upper limit of conditional expression (1), the power of the first lens group would be insufficient, and therefore, the amount of movement of the first lens group would be increased in order to achieve high zoom. This would result in an increased total optical length at the telephoto end. In addition, there would be a need to increase the power of the third lens group, making it is difficult to correct axial chromatic aberration. Therefore, when the conditional expression (1) is satisfied, it is possible to achieve high performance by suppressing the occurrence of various types of aberrations in the entire zoom range having a wide angle of view exceeding 70° and a high zoom ratio.

Conditional expression (2) defines conditions for achieving the lightweight of the sixth lens group that performs focusing and acquisition of the back focus at the wide angle end by appropriately setting the focal length of the sixth lens group. When the setting is below the lower limit of conditional expression (2), it is difficult to obtain the back focus at the wide angle end. In addition, due to the increased diameter of the sixth lens group, it is difficult to obtain a small and lightweight focus group, and difficult to ensure the telecentricity of the light beam incident on the imaging surface. On the other hand, when the setting exceeds the upper limit of conditional expression (2), the back focus would be prolonged to increase the total optical length, leading to the enlargement of the zoom lens. In addition, this also causes an increase in axial chromatic aberration, lateral chromatic aberration, spherical aberration and comatic aberration generated in the sixth lens group at focusing. Therefore, satisfying the conditional expression (2) makes it possible to achieve the lightweight of the focus group and acquisition of the back focus while achieving miniaturization and high performance of the zoom lens.

According to the above-described characteristic configuration, it is possible to implement a zoom lens and an imaging optical device that achieves miniaturization and a sufficient zoom ratio while having an angle of view exceeding 700 at the wide angle end and that includes a lightweight focus group suitable for capturing a moving image while suppressing occurrence of aberrations in the entire zoom range. Using the zoom lens or the imaging optical device for a digital device (for example, a digital camera) makes it possible to add a high-performance image input function to the digital device while achieving miniaturization, making it possible to contribute to achieve miniaturization, low cost, higher performance and higher functionality in the digital device. For example, a zoom lens having the above-described characteristic configuration is suitable as an interchangeable lens for a mirrorless interchangeable lens digital camera, making it possible to implement a portable, lightweight, miniaturized, and high-performance interchangeable lens. Conditions. or the like, needed to obtain these effects with good balance and to achieve high optical performance, lightweight, and miniaturization will be described below.

It would be preferable to satisfy the following conditional expression (1a).

$$5.9 \leq f1/fw \leq 8 \qquad (1a)$$

Conditional expression (1a) defines a preferable conditional range based on the above-described viewpoint, or the like, among the conditional ranges defined by conditional expression (1). Accordingly, satisfying conditional expression (1a) would preferably make it possible to further enhance the above-described effects.

It would be preferable to satisfy the following conditional expression (2a).

$$-2.50 \leq f6/bfw \leq -1.4 \qquad (2a)$$

Conditional expression (2a) defines a preferable conditional range based on the above-described viewpoint, or the like, among the conditional ranges defined by the conditional expression (2). Accordingly, satisfying conditional expression (2a) would preferably make it possible to further enhance the above-described effects.

It is desirable that the third lens group includes at least one positive lens that satisfies the following conditional expression (3). When at least one positive lens in the third lens group has an Abbe number in a range satisfying conditional expression (3), it is possible to properly correct axial chromatic aberration and lateral chromatic aberration.

$$vdp \geq 65 \qquad (3)$$

where vdp is an Abbe number of positive lens in the third lens group.

It would be further preferable to satisfy the following conditional expression (3a).

$$vdp \geq 71 \qquad (3a)$$

Conditional expression (3a) defines a further preferable conditional range based on the above-described viewpoint, or the like, among the conditional ranges defined by the conditional expression (3). Accordingly, satisfying conditional expression (3a) would preferably make it possible to further enhance the above-described effects.

It is desirable to perform camera shake correction by moving the fourth lens group as a camera shake correction group in a direction orthogonal to the optical axis. When the fourth lens group is configured to perform camera shake correction in this manner, it is possible to reduce the lens diameter of the fourth lens group due to the convergence effect of the positive third lens group, leading to formation of a miniaturized and lightweight camera shake correction group.

It would be preferable to satisfy the following conditional expression (4).

$$0.1 \leq M2/M1 \leq 0.5 \qquad (4)$$

where

M1 is an amount of movement of the first lens group on the optical axis at zooming from the wide angle end to the telephoto end, M2 is the amount of movement of the second lens group on the optical axis at zooming from the wide angle end to the telephoto end.

Conditional expression (4) defines a condition for appropriately setting the amount of movement of the first lens group and the second lens group at zooming. When the setting is below the lower limit of conditional expression (4), the change in the interval between the first lens group and the second lens group becomes too great at zooming from the wide angle end to the telephoto end, and this would need enhanced power in each of lens groups in order to achieve a high zoom ratio. Enhancing the power in each of the lens groups leads to a tendency to increase spherical aberration and comatic aberration in the first lens group and the second lens group. This also leads to a tendency to increase the aberrations due to manufacturing errors such as decentration. When the amount of movement is set so as not to fall below the lower limit of conditional expression (4), there is no need to increase the power of each of the lens groups in order to achieve the high zoom ratio, making it possible to suppress the increase in the aberrations.

Conversely, when the setting exceeds the upper limit of conditional expression (4), the change in the interval between the first lens group and the second lens group becomes too small at zooming from the wide angle end to the telephoto end, leading to the tendency to increase the total lens length at the telephoto end. That is, setting the amount of movement so as not to exceed the upper limit of conditional expression (4) would make it possible to suppress an increase in the total lens length at the telephoto end. Therefore, satisfying conditional expression (4) makes it possible to achieve high performance and miniaturization in a well-balanced manner.

It would be further preferable to satisfy the following conditional expression (4a).

$$0.18 \leq M2/M1 \leq 0.4 \qquad (4a)$$

Conditional expression (4a) defines a further preferable conditional range based on the above-described viewpoint, or the like, among the conditional ranges defined by the conditional expression (4). Accordingly, satisfying conditional expression (4a) would preferably be possible to further enhance the above-described effects.

It is desirable that the sixth lens group includes one positive lens and one negative lens and satisfies the following conditional expression (5).

$$0.1 \leq T6/fw \leq 0.3 \qquad (5)$$

where fw is the focal length of the entire system at the wide angle end, and

T6 is a thickness of the sixth lens group on the optical axis.

Since the sixth lens group includes the positive lens and the negative lens, it is possible to suppress chromatic aberration that varies at focusing. Conditional expression (5) defines a condition for achieving both lightweight and miniaturization of the focus group and correction of chromatic aberration by appropriately setting the thickness of the sixth lens group on the optical axis. When the setting is below the lower limit of conditional expression (5), the positive power in the sixth lens group is insufficient, leading to the tendency to increase the chromatic aberration that varies at focusing. That is, setting the value so as not to be below the lower limit of conditional expression (5) would make it possible to suppress chromatic aberration that varies at focusing.

Conversely, when the setting exceeds the upper limit of conditional expression (5), the thickness of the sixth lens group becomes too large, making it difficult to adopt the sixth lens group as a miniaturized and lightweight focus group. That is, setting the value so as not to exceed the upper limit of conditional expression (5) would make it possible to use the sixth lens group as a miniaturized and lightweight focus group suitable for capturing a moving image. Therefore, satisfying conditional expression (5) makes it possible to achieve a lightweight and miniaturized focus group and correction of chromatic aberration in a well-balanced manner.

It would be further preferable to satisfy the following conditional expression (5a).

$$0.13 \leq T6/fw \leq 0.23 \qquad (5a)$$

Conditional expression (5a) defines a further preferable conditional range based on the above-described viewpoint, or the like, among the conditional ranges defined by the conditional expression (5). Accordingly, satisfying conditional expression (5a) would preferably be possible to further enhance the above-described effects.

It would be preferable to satisfy the following conditional expression (6).

$$-1.2 \leq f2/fw \leq -0.76 \qquad (6)$$

where fw is the focal length of the entire system at the wide angle end, and f2 is the focal length of the second lens group.

Conditional expression (6) defines conditions for properly correcting aberrations over a wide zoom range by appropriately setting the focal length of the second lens group. When the setting is below the lower limit of conditional expression (6), the negative power of the second lens group becomes insufficient, leading to the tendency of an increased Petzval sum, making it difficult to correct the field curvature. That is, setting the value so as not to fall below the lower limit of the conditional expression (6) would make it possible to effectively correct the field curvature.

Conversely, when the setting exceeds the upper limit of conditional expression (6), the negative power of the second lens group becomes too high, leading to the tendency to increase variation in spherical aberration and comatic aberration at zooming. This also makes it difficult to perform distortion correction at the wide angle end. That is, setting the value so as not to exceed the upper limit of conditional expression (6) would make it possible to suppress the variation in spherical aberration and comatic aberration at zooming and to properly correct distortion at the wide angle end. Therefore, satisfying conditional expression (6) would make it possible to correct various types of aberrations in a well-balanced manner over a wide zoom range.

It would be further preferable to satisfy the following conditional expression (6a).

$$-1.1 \le f2/fw \le -0.77 \tag{6a}$$

Conditional expression (6a) defines a further preferable conditional range based on the above-described viewpoint, or the like, among the conditional ranges defined by the conditional expression (6). Accordingly, satisfying conditional expression (6a) would preferably make it possible to further enhance the above-described effects.

The zoom lens described above is suitable for use as an imaging lens for a digital device with an image input function (for example, a digital camera with interchangeable lenses). It is possible, when used in combination with an image sensor, or the like, to implement an imaging optical device that optically captures an image of a subject and outputs it as an electrical signal. The imaging optical device is an optical device being a main component of a camera used for capturing a still image or a moving image of a subject and includes, for example, in order from the object side (that is, the subject side), a zoom lens that forms an optical image of an object, and an image sensor that converts the optical image formed by the zoom lens into an electrical signal. In addition, arranging the zoom lens having the above-described characteristic configuration so as to form an optical image of the subject on a light receiving surface (that is, the imaging surface) of the image sensor would make it possible to implement a miniaturized imaging optical device having high performance at low cost, and a digital device including the imaging optical device.

Examples of digital devices with an image input function include cameras such as digital cameras, video cameras, surveillance cameras, security cameras, in-vehicle cameras, and video-phone cameras. Examples further include equipment combining each of personal computers, portable digital devices (for example, mobile phones, smartphones (high-performance mobile phones), tablet terminals, mobile computers, or the like), peripheral devices (scanners, printers, mice, or the like), other digital devices (drive recorders, defense equipment, or the like) with a built-in or an external camera function. As can be seen from these examples, it is not merely possible to use an imaging optical device to configure a camera, but also possible to mount the imaging optical device on various types of equipment to add a camera function to the equipment. For example, it is possible to implement a digital device with an image input function, such as a mobile phone with a camera.

Figure 15:
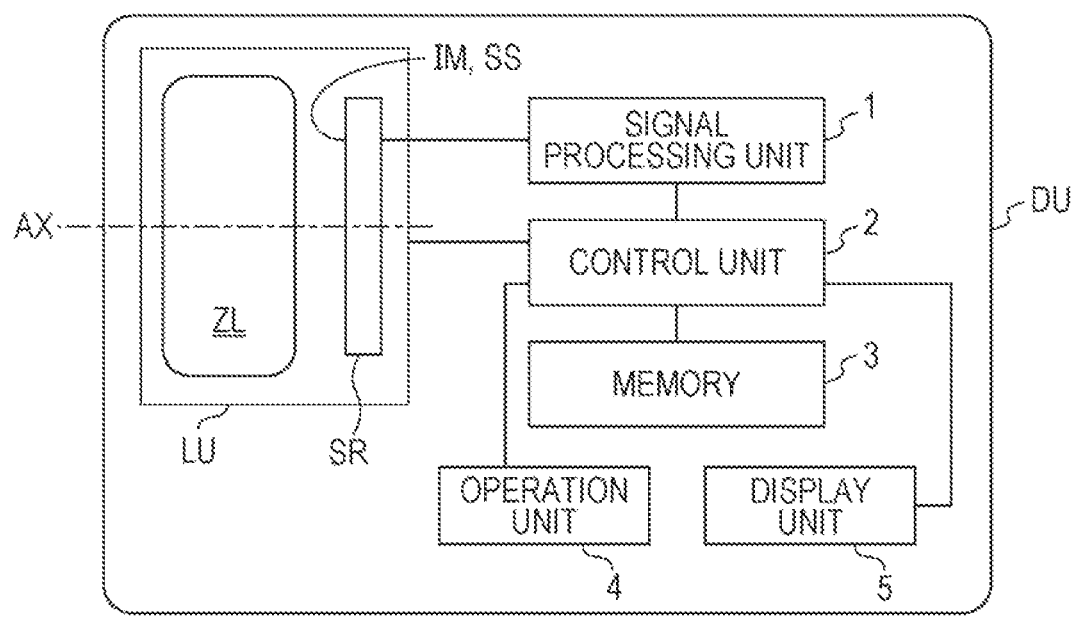
FIG. 15 is a schematic diagram illustrating a general configuration example of a digital device equipped with a zoom lens.

FIG. 15 is a schematic cross-sectional view illustrating a general configuration example of a digital device DU as an example of a digital device with an image input function. An imaging optical device LU mounted on the digital device DU illustrated in FIG. 15 includes, in order from the object side (that is, the subject side): a zoom lens ZL (AX: optical axis) that forms a zoomed optical image (image surface) IM of an object; and an image sensor SR that converts the optical image IM formed on a light receiving surface (imaging surface) SS by the zoom lens ZL into an electrical signal. On the imaging optical device LU, a parallel plane plate (for example, a coverslip for the image sensor SR; corresponding to an optical filter such as an optical low-pass filter and an infrared cut filter, which is arranged as necessary) is arranged as necessary.

In a case where this imaging optical device LU is used to form the digital device DU with an image input function, the imaging optical device LU is normally arranged inside the body. However, when implementing the camera function, it is possible to adopt a form as needed. For example, the imaging optical device LU may be unitized and arranged to be pivotable with respect to the main body of the digital device DU. The unitized imaging optical device LU is may be formed to be detachable with respect to the main body of the digital device DU (that is, camera with interchangeable lenses), as an interchangeable lens with an image sensor.

The zoom lens ZL includes six lens groups of positive, negative, positive, negative, positive, and negative, changes the on-axis intervals of individual lens groups to perform zooming, and moves the sixth lens group along the optical axis AX to perform focusing, so as to form the optical image IM on the light receiving surface SS of the image sensor SR. Examples of the image sensor SR include a solid-state image sensor having a plurality of pixels, such as a charge coupled device (CCD) image sensor and a complementary metal-oxide semiconductor (CMOS) image sensor. Since the zoom lens ZL is provided so as to form the optical image IM of the subject on the light receiving surface SS which is a photo-electric converter of the image sensor SR, the optical image IM formed by the zoom lens ZL is converted into an electrical signal by the image sensor SR.

The digital device DU includes a signal processing unit 1, a control unit 2, a memory 3, an operation unit 4, a display unit 5 or the like in addition to the imaging optical device LU. The signal generated by the image sensor SR undergoes predetermined digital image processing, image compression processing, or the like as necessary at the signal processing unit 1, and then, recorded as a digital image signal in the memory 3 (semiconductor memory, optical disk, or the like), or transmitted to other devices via a cable or after being converted into an infrared signal or the like (for example, a communication function of a mobile phone). The control unit 2 includes a microcomputer and intensively performs control of functions such as an image capture function (still image capture function, moving image capture function, or the like), an image playback function, or the like, and control of a lens moving mechanism for zooming, focusing, camera shake correction, or the like. For example, the control unit 2 controls the imaging optical device LU so as to perform at least one of capturing of still image or capturing of a moving image, of a subject. The display unit 5 includes a display such as a liquid crystal monitor, and displays an image using an image signal converted by the image sensor SR or using image information recorded in the memory 3. The operation unit 4 includes operation members such as an operation button (for example, a release button) and an operation dial (for example, an image capturing mode dial), and transmits information input by the operator to the control unit 2.

Next, specific optical configurations of the zoom lens ZL will be described in more detail with reference to first to seventh embodiments. FIGS. 1 to 7 are optical configuration diagrams respectively corresponding to the zoom lenses ZL forming the first to seventh embodiments, indicating lens cross-sectional shapes and lens arrangement in optical cross sections at a wide angle end (W), a middle focal length state (M), and a telephoto end (T). In each of the optical configuration diagrams, an arrow mj (j=1, 2, . . . , 6) schematically indicates outline of movement of a j-th lens group Grj (j=1, 2, . . . , 6) in zooming from the wide angle end (W) to the telephoto end (T).

As can be seen from the optical configuration diagram, the zoom lens ZL of the first to seventh embodiments is a six-group zoom unit including positive, negative, positive, negative, positive, and negative lenses, in which zooming is performed from the wide angle end (W) to the telephoto end (T) by changing all the lens group intervals on the axis. At zooming, all the lens groups individually move relative to the image surface IM, and a stop (aperture stop) ST moves as a part of the third lens group Gr3. Furthermore, at zooming from the wide angle end (W) to the telephoto end (T), the interval increases between the first lens group Gr1 and the second lens group Gr2, the interval decreases between the second lens group Gr2 and the third lens group Gr3, the interval increases between the third lens group Gr3 and the fourth lens group Gr4, the interval decreases between the fourth lens group Gr4 and the fifth lens group Gr5, the interval decreases between the fifth lens group Gr5 and the sixth lens group Gr6, and the interval increases between the sixth lens group Gr6 and the image surface IM. The third lens group Gr3 and the fifth lens group Gr5 are linked with each other so as to move together at zooming. Since this link enables formation of the third lens group Gr3 and the fifth lens group Gr5 by a same lens holder, the zoom mechanism can be simplified.

At focusing, the sixth lens group Gr6 moves along the optical axis AX. That is, the sixth lens group Gr6 is a focus group, and moves to the image surface IM side at focusing from an object at infinity to an object at close proximity, as indicated by an arrow mF. At the time of camera shake correction, the fourth lens group Gr4 moves in a direction perpendicular to the optical axis AX (direction orthogonal to the optical axis AX). That is, the fourth lens group Gr4 is a camera shake correction group, and moves in the direction perpendicular to the optical axis AX as indicated by an arrow mV to perform camera shake correction.

Individual groups in the first embodiment (FIG. 1) are formed as follows in order from the object side when individual lenses are viewed with a paraxial surface shape. The first lens group Gr1 is formed by a cemented lens including a negative meniscus lens concave on the image side and a biconvex positive lens, and by a positive meniscus lens convex on the object side. The second lens group Gr2 is formed by a negative meniscus lens concave on the image side, a biconcave negative lens, a biconvex positive lens, and a negative meniscus lens concave on the object side. The third lens group Gr3 is formed by a biconvex positive lens having double-sided aspheric surfaces, a stop ST, and a cemented lens including a negative meniscus lens concave on the image side and a biconvex positive lens. The fourth lens group Gr4 is formed by a cemented lens including a biconcave negative lens and a positive meniscus lens (having aspheric image side surface) convex on the object side. The fifth lens group Gr5 is formed by a biconvex positive lens, and a cemented lens including a biconvex positive lens and a negative meniscus lens concave on the object side. The sixth lens group Gr6 is formed by a cemented lens including a biconvex positive lens and a biconcave negative lens.

Individual groups in the second embodiment (FIG. 2) are formed as follows in order from the object side when individual lenses are viewed with a paraxial surface shape. The first lens group Gr1 is formed by a cemented lens including a negative meniscus lens concave on the image side and a biconvex positive lens, and by a positive meniscus lens convex on the object side. The second lens group Gr2 is formed by a negative meniscus lens concave on the image side, a biconcave negative lens, a biconvex positive lens, and a negative meniscus lens concave on the object side. The third lens group Gr3 is formed by a positive meniscus lens convex on the object side having double-sided aspheric surfaces, a stop ST, and a cemented lens including a negative meniscus lens concave on the image side and a biconvex positive lens. The fourth lens group Gr4 is formed by a cemented lens including a biconcave negative lens and a positive meniscus lens (having aspheric image side surface) convex on the object side. The fifth lens group Gr5 is formed by a biconvex positive lens, and a cemented lens including a biconvex positive lens and a negative meniscus lens concave on the object side. The sixth lens group Gr6 is formed by a cemented lens including a biconvex positive lens and a biconcave negative lens.

Individual groups in the third embodiment (FIG. 3) are formed as follows in order from the object side when individual lenses are viewed with a paraxial surface shape. The first lens group Gr1 is formed by a cemented lens including a negative meniscus lens concave on the image side and a biconvex positive lens, and by a positive meniscus lens convex on the object side. The second lens group Gr2 is formed by a negative meniscus lens concave on the image side, a biconcave negative lens, a biconvex positive lens, and a negative meniscus lens concave on the object side. The third lens group Gr3 is formed by a positive meniscus lens convex on the object side having double-sided aspheric surfaces, a stop ST, and a cemented lens including a negative meniscus lens concave on the image side and a biconvex positive lens. The fourth lens group Gr4 is formed by a cemented lens including a biconcave negative lens and a positive meniscus lens (having aspheric image side surface) convex on the object side. The fifth lens group Gr5 is formed by a biconvex positive lets, and a cemented lens including a biconvex positive lens and a negative meniscus lens concave on the object side. The sixth lens group Gr6 is formed by a cemented lens including a biconvex positive lens and a biconcave negative lens.

Individual groups in the fourth embodiment (FIG. 4) are formed as follows in order from the object side when individual lenses are viewed with a paraxial surface shape. The first lens group Gr1 is formed by a cemented lens including a negative meniscus lens concave on the image side and a biconvex positive lens, and by a positive meniscus lens convex on the object side. The second lens group Gr2 is formed by a negative meniscus lens concave on the image side, a biconcave negative lens, a biconvex positive lens, and a negative meniscus lens concave on the object side. The third lens group Gr3 is formed by a biconvex positive lens having double-sided aspheric surfaces, a stop ST, and a cemented lens including a negative meniscus lens concave on the image side and a biconvex positive lens. The fourth lens group Gr4 is formed by a cemented lens including a biconcave negative lens and a positive meniscus lens (having aspheric image side surface) convex on the object side. The fifth lens group Gr5 is formed by a positive meniscus lens convex on the image side, and a cemented lens including a biconvex positive lens and a negative meniscus lens concave on the object side. The sixth lens group Gr6 is formed by a cemented lens including a biconvex positive lens and a biconcave negative lens.

Individual groups in the fifth embodiment (FIG. 5) are formed as follows in order from the object side when individual lenses are viewed with a paraxial surface shape. The first lens group Gr1 is formed by a cemented lens including a negative meniscus lens concave on the image side and a positive meniscus lens convex on the object side, and by a positive meniscus lens convex on the object side. The second lens group Gr2 is formed by a negative meniscus lens concave on the image side, a biconcave negative lens, a biconvex positive lens, and a biconcave negative lens. The third lens group Gr3 is formed by a biconvex positive lens having double-sided aspheric surfaces, a stop ST, and a cemented lens including a negative meniscus lens concave on the image side and a biconvex positive lens. The fourth lens group Gr4 is formed by a cemented lens including a biconcave negative lens and a positive meniscus lens (having aspheric image side surface) convex on the object side. The fifth lens group Gr5 is formed by a biconvex positive lens, and a cemented lens including a biconvex positive lens and a negative meniscus lens concave on the object side. The sixth lens group Gr6 is formed by a cemented lens including a biconvex positive lens and a biconcave negative lens.

Individual groups in the sixth embodiment (FIG. 6) are formed as follows in order from the object side when individual lenses are viewed with a paraxial surface shape. The first lens group Gr1 is formed by a cemented lens including a negative meniscus lens concave on the image side and a positive meniscus lens convex on the object side, and by a positive meniscus lens convex on the object side. The second lens group Gr2 is formed by a negative meniscus lens concave on the image side, a biconcave negative lens, a biconvex positive lens, and a biconcave negative lens. The third lens group Gr3 is formed by a positive meniscus lens convex on the object side and having an image side surface formed in a composite aspheric surface, a stop ST, and a cemented lens including a negative meniscus lens concave on the image side and a biconvex positive lens. The fourth lens group Gr4 is formed by a cemented lens including a biconcave negative lens and a positive meniscus lens (having aspheric image side surface) convex on the object side. The fifth lens group Gr5 is formed by a biconvex positive lens, and a cemented lens including a biconvex positive lens and a negative meniscus lens concave on the object side. The sixth lens group Gr6 is formed by a cemented lens including a biconvex positive lens and a biconcave negative lens.

Individual groups in the seventh embodiment (FIG. 7) are formed as follows in order from the object side when individual lenses are viewed with a paraxial surface shape. The first lens group Gr1 is formed by a cemented lens including a negative meniscus lens concave on the image side and a positive meniscus lens convex on the object side, and by a positive meniscus lens convex on the object side. The second lens group Gr2 includes a negative meniscus lens concave on the image side, a biconcave negative lens, a biconvex positive lens, and a plano-concave negative lens concave on the object side. The third lens group Gr3 is formed by a stop ST, a positive meniscus lens convex on the object side and having an image side surface formed by a composite aspheric surface, and a cemented lens including a negative meniscus lens concave on the image side and a biconvex positive lens. The fourth lens group Gr4 is formed by a cemented lens including a biconcave negative lens and a positive meniscus lens (having aspheric image side surface) convex on the object side. The fifth lens group Gr5 is formed by a biconvex positive lens, and a cemented lens including a biconvex positive lens and a negative meniscus lens concave on the object side. The sixth lens group Gr6 is formed by a cemented lens including a biconvex positive lens and a biconcave negative lens.

EXAMPLES

Hereinafter, a configuration or the like of the zoom lens with which the embodiments of the present invention are implemented will be described more specifically with reference to construction data, or the like, of each of Examples. Herein, each of Examples 1 to 7 (EX1 to 7) is a numerical-value example that corresponds to each of the above-described first to seventh embodiments. Each of the optical configuration diagrams (FIGS. 1 to 7) representing the first to seventh embodiments illustrates lens configurations, or the like, for each of the corresponding Examples 1 to 7.

The construction data for each of Examples indicate, as surface data, in the order from a field on the left side, a surface number i, a radius of curvature r (mm), an on-axis surface interval d (mm), a refractive index rd regarding d-line (wavelength: 587.56 nm), and Abbe number vd regarding the d-line. The surface marked with * in the surface number is an aspheric surface, and the surface shape is defined by the following formula (AS) using the local orthogonal coordinate system (x, y, z) with the surface vertex as the origin. Aspheric data includes an aspheric coefficient or the like. Note that the coefficient of the term not described in the aspheric data of each of Examples is 0, and e-n=×10$^{-n}$ holds for all data.

$$z=(c \cdot h^2)/[1+\sqrt{\{1-(1+K) \cdot c^2 \cdot h^2\}}]+\Sigma(Aj \cdot h^j) \quad (AS)$$

where h is a height in the direction perpendicular to the z axis (optical axis AX) ($h^2=x^2+y^2$).

z is a sag in the optical axis AX direction at the position of height h (based on the surface vertex), c is a curvature at the surface vertex (the reciprocal of the radius of curvature r), K is a conic constant, and Aj is a j-th order aspheric coefficient.

Various types of data include a zoom ratio and data, for each of focal length conditions of W, M, and T, including: focal length of the entire system (Fl, mm), F-number (Fno.), a half angle of view (ω, °), an image height (y'max, mm), total lens length (TL, mm), back focus (BF,mm), and variable surface interval (di, i: surface number, mm), for the entire system. Zoom lens group data includes the focal length (fj,mm) of each of the j-th lens groups Grj(j=1, 2, . . . ,6). Note that the back focus BF is represented as a distance from the lens last surface to the paraxial image surface, in an air-equivalent length. The total lens length TL is obtained by adding the back focus BF to the distance from the lens first surface to the lens last surface. Moreover. Table 1 illustrates data related to the conditional expression for each of Examples, and Table 2 illustrates values corresponding to the conditional expression for each of Examples.

FIGS. 8A to 14I are distortion diagrams (longitudinal aberration diagrams in an infinity focusing state) corresponding to Examples 1 to 7 (EX1 to EX7), respectively. Specifically, FIGS. 8A to 8C, 9A to 9C, 10A to 10C, 11A to 11C, 12A to 12C, 13A to 13C, and 14A to 14C indicate various types of aberration at the wide angle end (W). FIGS. 8D to 8F, 9D to 9F, 10D to 10F, 11D to 11F, 12D to 12F, 13D to 13F, and 14D to 14F indicate various types of aberration at a middle focal length state M. FIGS. 8G to 8I, 9G to 9, 10G to 10I, 11G to 11I, 12G to 12I, 13G to 13I, and 14G to 14I indicate various types of aberration at the telephoto end (T). In FIGS. 8A to 14I, each of FIGS. 8A, 8D, 8G, 9A, 9D, 9G, 10A, 10D, 10G, 11A, 11D, 11G, 12A, 12D, 12G, 13A, 13D, 13G, 14A, 14D, and 14G indicates a spherical aberration diagram. Each of FIGS. 8B, 8E, 8H, 9B, 9E, 9H, 10B, 10E, 10H, 11B, 11E, 11H, 12B, 12E, 12H, 13B, 13E, 13H, 14B, 14E, and 14H indicates an astigmatism diagram. Each of FIGS. 8C, 8F, 8I, 9C, 9F, 9I, 10C, 10F, 10I, 11C, 11F, 11I, 12C, 12F, 12I, 13C, 13F, 13I, 14C, 14F, and 14I indicates a distortion aberration diagram.

The spherical aberration diagram represents a spherical aberration amount with respect to the d-line (wavelength:

587.56 nm) illustrated in a solid line, a spherical aberration amount with respect to the C-line (wavelength: 656.28 nm) illustrated in a one-dot chain line, and a spherical aberration amount with respect to the g-line (wavelength: 435.84 nm) illustrated in a broken line, respectively, as an individual shift amount (unit: mm) from the paraxial image surface in the optical axis AX direction. In the diagram, the vertical axis represents a value normalized from the incident height toward the pupil with the maximum height thereof (namely, relative pupil height). In the astigmatism diagram, the broken line T represents a tangential image surface with respect to the d-line, the solid line S represents a sagittal image surface with respect to the d-line, as a shift amount (unit: mm) from the paraxial image surface in the optical axis AX direction. In the diagram, the vertical axis represents an image height (IMG HT, unit: mm). In the distortion aberration diagram, the horizontal axis represents distortion (unit: %) with respect to the d-line, and the vertical axis represents the image height (IMG HT, unit: mm). Note that the maximum value of the image height IMG HT corresponds to half the diagonal length of the light receiving surface SS of the image sensor SR.

Example 1 unit: mm
Surface data

| i | r | d | nd | vd |
|---|---|---|---|---|
| object | infinity | infinity | | |
| 1 | 123.707 | 1.576 | 1.84666 | 23.78 |
| 2 | 81.661 | 9.873 | 1.48749 | 70.44 |
| 3 | −423.320 | 0.131 | | |
| 4 | 67.807 | 6.626 | 1.49700 | 81.61 |
| 5 | 212.196 | variable | | |
| 6 | 80.374 | 1.182 | 1.80420 | 46.50 |
| 7 | 16.407 | 8.163 | | |
| 8 | −34.026 | 1.182 | 1.80420 | 46.50 |
| 9 | 80.604 | 0.131 | | |
| 10 | 35.713 | 5.334 | 1.84666 | 23.78 |
| 11 | −40.356 | 1.939 | | |
| 12 | −24.568 | 1.182 | 1.77250 | 49.62 |
| 13 | −297.425 | variable | | |
| 14* | 23.382 | 3.950 | 1.58313 | 59.46 |
| 15* | −155.086 | 1.829 | | |
| 16 (stop) | infinity | 4.277 | | |
| 17 | 61.676 | 1.182 | 1.84666 | 23.78 |
| 18 | 18.826 | 5.609 | 1.49700 | 81.61 |
| 19 | −37.572 | variable | | |
| 20 | −124.038 | 1.182 | 1.77250 | 49.62 |
| 21 | 13.520 | 3.791 | 1.68893 | 31.16 |
| 22* | 51.183 | variable | | |
| 23 | 545.445 | 2.688 | 1.80610 | 33.27 |
| 24 | −40.132 | 3.034 | | |
| 25 | 22.964 | 5.130 | 1.48749 | 70.44 |
| 26 | −32.001 | 1.313 | 1.84666 | 23.78 |
| 27 | −173.271 | variable | | |
| 28 | 188.055 | 2.083 | 1.76182 | 26.61 |
| 29 | −56.446 | 1.182 | 1.77250 | 49.62 |
| 30 | 33.481 | variable | | |
| image | infinity | | | |

Aspheric data

| i | K | A4 | A6 | A8 |
|---|---|---|---|---|
| 14 | 0.0000e+000 | −8.7198e−006 | 9.4090e−008 | −1.3584e−009 |
| 15 | 0.0000e+000 | 1.2313e−005 | 6.2655e−008 | −5.7934e−010 |
| 22 | 0.0000e+000 | −9.8578e−006 | 1.2231e−008 | −8.1300e−010 |

-continued

| i | A10 | A12 | A14 | A16 |
|---|---|---|---|---|
| 14 | 1.4916e−011 | −2.8479e−014 | 0.0000e+000 | 0.0000e+000 |
| 15 | 7.7155e−012 | 0.0000e+000 | 0.0000e+000 | 0.0000e+000 |
| 22 | 4.8140e−012 | 0.0000e+000 | 0.0000e+000 | 0.0000e+000 |

Various types of data
zoom ratio 14.12

| | Wide angle (W) | Middle (M) | Telephoto (T) |
|---|---|---|---|
| Fl | 19.055 | 72.464 | 269.110 |
| Fno. | 3.587 | 5.200 | 6.834 |
| ω | 36.694 | 11.087 | 3.020 |
| y'max | 14.200 | 14.200 | 14.200 |
| TL | 146.503 | 185.415 | 242.251 |
| BF | 26.754 | 52.973 | 89.586 |
| d5 | 2.285 | 33.601 | 67.323 |
| d13 | 32.332 | 9.971 | 1.313 |
| d19 | 1.576 | 4.737 | 4.968 |
| d22 | 5.910 | 2.749 | 2.517 |
| d27 | 3.076 | 6.815 | 1.973 |
| d30 | 26.754 | 52.973 | 89.586 |

Zoom lens group data

| Group j (surface i) | focal length fj |
|---|---|
| 1 (1-5) | 116.509 |
| 2 (6-13) | −15.719 |
| 3 (14-19) | 29.628 |
| 4 (20-22) | −37.984 |
| 5 (23-27) | 27.627 |
| 6 (28-30) | −52.520 |

Example 2 unit: mm
Surface data

| i | r | d | nd | vd |
|---|---|---|---|---|
| object | infinity | infinity | | |
| 1 | 120.998 | 1.576 | 1.84666 | 23.78 |
| 2 | 82.224 | 8.852 | 1.48749 | 70.44 |
| 3 | −1107.516 | 0.131 | | |
| 4 | 71.484 | 6.658 | 1.49700 | 81.61 |
| 5 | 254.724 | variable | | |
| 6 | 64.680 | 1.182 | 1.80420 | 46.50 |
| 7 | 15.804 | 8.544 | | |
| 8 | −36.258 | 1.182 | 1.80420 | 46.50 |
| 9 | 80.644 | 0.131 | | |
| 10 | 33.853 | 5.397 | 1.84666 | 23.78 |
| 11 | −44.723 | 2.089 | | |
| 12 | −25.481 | 1.182 | 1.77250 | 49.62 |
| 13 | −802.816 | variable | | |
| 14* | 23.331 | 3.459 | 1.58313 | 59.46 |
| 15* | 513.593 | 2.341 | | |
| 16 (stop) | infinity | 2.869 | | |
| 17 | 68.825 | 1.182 | 1.84666 | 23.78 |
| 18 | 22.104 | 5.658 | 1.49700 | 81.61 |
| 19 | −28.020 | variable | | |
| 20 | −119.820 | 1.182 | 1.77250 | 49.62 |
| 21 | 14.104 | 3.672 | 1.68893 | 31.16 |
| 22* | 58.156 | variable | | |
| 23 | 233.021 | 2.813 | 1.72342 | 37.99 |
| 24 | −36.830 | 0.411 | | |
| 25 | 22.636 | 5.107 | 1.48749 | 70.44 |
| 26 | −33.430 | 1.313 | 1.84666 | 23.78 |
| 27 | −548.732 | variable | | |
| 28 | 262.814 | 2.006 | 1.80518 | 25.46 |
| 29 | −55.224 | 1.182 | 1.77250 | 49.62 |
| 30 | 30.964 | variable | | |
| image | infinity | | | |

-continued

Aspheric data

| i | K | A4 | A6 | A8 |
|---|---|---|---|---|
| 14 | 0.0000e+000 | 1.6341e-006 | 2.9430e-007 | -3.5204e-009 |
| 15 | 0.0000e+000 | 2.8177e-005 | 2.6988e-007 | -2.2911e-009 |
| 22 | 0.0000e+000 | -8.3087e-006 | 1.3547e-008 | -8.2567e-010 |

| i | A10 | A12 | A14 | A16 |
|---|---|---|---|---|
| 14 | 3.7147e-011 | -7.1480e-014 | 0.0000e+000 | 0.0000e+000 |
| 15 | 2.3974e-011 | 0.0000e+000 | 0.0000e+000 | 0.0000e+000 |
| 22 | 5.4411e-012 | 0.0000e+000 | 0.0000e+000 | 0.0000e+000 |

Various types of data
zoom ratio 14.12

| | Wide angle (W) | Middle (M) | Telephoto (T) |
|---|---|---|---|
| Fl | 19.057 | 72.470 | 269.059 |
| Fno. | 3.587 | 5.200 | 6.834 |
| ω | 36.692 | 11.086 | 3.021 |
| y'max | 14.200 | 14.200 | 14.200 |
| TL | 146.527 | 183.487 | 242.251 |
| BF | 31.827 | 53.458 | 87.153 |
| d5 | 2.158 | 35.844 | 73.729 |
| d13 | 32.521 | 8.612 | 1.313 |
| d19 | 1.576 | 4.928 | 5.600 |
| d22 | 6.386 | 3.034 | 2.362 |
| d27 | 1.943 | 7.494 | 1.976 |
| d30 | 31.827 | 53.458 | 87.153 |

Zoom lens group data

| Group j (surface i) | focal length fj |
|---|---|
| 1 (1-5) | 124.038 |
| 2 (6-13) | -15.801 |
| 3 (14-19) | 29.311 |
| 4 (20-22) | -40.627 |
| 5 (23-27) | 27.661 |
| 6 (28-30) | -47.284 |

Example 3 unit: mm
Surface data

| i | r | d | nd | vd |
|---|---|---|---|---|
| object | infinity | infinity | | |
| 1 | 119.416 | 1.576 | 1.84666 | 23.78 |
| 2 | 81.018 | 9.202 | 1.48749 | 70.44 |
| 3 | -631.073 | 0.131 | | |
| 4 | 72.794 | 6.373 | 1.49700 | 81.61 |
| 5 | 237.399 | variable | | |
| 6 | 73.840 | 1.182 | 1.80420 | 46.50 |
| 7 | 16.196 | 8.369 | | |
| 8 | -36.393 | 1.182 | 1.80420 | 46.50 |
| 9 | 70.910 | 0.131 | | |
| 10 | 33.577 | 5.503 | 1.84666 | 23.78 |
| 11 | -43.002 | 2.194 | | |
| 12 | -24.829 | 1.182 | 1.77250 | 49.62 |
| 13 | -728.871 | variable | | |
| 14* | 20.895 | 3.932 | 1.58313 | 59.46 |
| 15* | 107.358 | 2.765 | | |
| 16 (stop) | infinity | 1.875 | | |
| 17 | 62.543 | 1.182 | 1.84666 | 23.78 |
| 18 | 21.979 | 5.590 | 1.49700 | 81.61 |
| 19 | -28.590 | variable | | |
| 20 | -107.103 | 1.182 | 1.77250 | 49.62 |
| 21 | 14.420 | 3.631 | 1.68893 | 31.16 |
| 22* | 56.596 | variable | | |
| 23 | 181.524 | 2.952 | 1.72342 | 37.99 |
| 24 | -35.387 | 0.131 | | |
| 25 | 22.815 | 5.173 | 1.48749 | 70.44 |
| 26 | -32.560 | 1.313 | 1.84666 | 23.78 |
| 27 | -565.582 | variable | | |
| 28 | 229.926 | 1.966 | 1.80518 | 25.46 |
| 29 | -62.513 | 1.182 | 1.77250 | 49.62 |
| 30 | 31.846 | variable | | |
| image | infinity | | | |

Aspheric data

| i | K | A4 | A6 | A8 |
|---|---|---|---|---|
| 14 | 0.0000e+000 | 8.3141e-006 | 2.6197e-007 | -2.3415e-009 |
| 15 | 0.0000e+000 | 4.0478e-005 | 2.6910e-007 | -1.4156e-009 |
| 22 | 0.0000e+000 | -8.5868e-006 | 1.4215e-008 | -7.7408e-010 |

| i | A10 | A12 | A14 | A16 |
|---|---|---|---|---|
| 14 | 2.7561e-011 | -4.8706e-014 | 0.0000e+000 | 0.0000e+000 |
| 15 | 2.0868e-011 | 0.0000e+000 | 0.0000e+000 | 0.0000e+000 |
| 22 | 4.8772e-012 | 0.0000e+000 | 0.0000e+000 | 0.0000e+000 |

Various types of data
zoom ratio 14.12

| | Wide angle (W) | Middle (M) | Telephoto (T) |
|---|---|---|---|
| Fl | 19.054 | 72.454 | 269.023 |
| Fno. | 3.587 | 5.200 | 6.834 |
| ω | 36.696 | 11.089 | 3.021 |
| y'max | 14.200 | 14.200 | 14.200 |
| TL | 146.528 | 186.290 | 242.246 |
| BF | 33.369 | 57.970 | 86.928 |
| d5 | 2.195 | 34.750 | 74.033 |
| d13 | 31.024 | 8.704 | 1.313 |
| d19 | 1.576 | 5.236 | 5.683 |
| d22 | 6.519 | 2.859 | 2.411 |
| d27 | 1.946 | 6.874 | 1.979 |
| d30 | 33.369 | 57.970 | 86.928 |

Zoom lens group data

| Group j (surface i) | focal length fj |
|---|---|
| 1 (1-5) | 122.651 |
| 2 (6-13) | -15.340 |
| 3 (14-19) | 29.567 |
| 4 (20-22) | -39.049 |
| 5 (23-27) | 26.688 |
| 6 (28-30) | -49.808 |

Example 4 unit: mm
Surface data

| i | r | d | nd | vd |
|---|---|---|---|---|
| object | infinity | infinity | | |
| 1 | 121.346 | 1.576 | 1.84666 | 23.78 |
| 2 | 81.008 | 9.449 | 1.48749 | 70.44 |
| 3 | -610.798 | 0.131 | | |
| 4 | 68.193 | 6.700 | 1.49700 | 81.61 |
| 5 | 226.416 | variable | | |
| 6 | 73.532 | 1.182 | 1.80420 | 46.50 |
| 7 | 16.028 | 8.362 | | |
| 8 | -35.028 | 1.182 | 1.80420 | 46.50 |
| 9 | 80.052 | 0.131 | | |
| 10 | 34.347 | 5.362 | 1.84666 | 23.78 |
| 11 | -43.239 | 2.060 | | |
| 12 | -24.916 | 1.182 | 1.77250 | 49.62 |
| 13 | -642.555 | variable | | |
| 14* | 24.444 | 3.479 | 1.58313 | 59.46 |
| 15* | -781.367 | 2.250 | | |
| 16 (stop) | infinity | 2.473 | | |

-continued

| i | r | d | nd | vd |
|---|---|---|---|---|
| 17 | 134.453 | 1.182 | 1.84666 | 23.78 |
| 18 | 29.936 | 5.510 | 1.49700 | 81.61 |
| 19 | −25.541 | variable | | |
| 20 | −161.760 | 1.182 | 1.77250 | 49.62 |
| 21 | 15.099 | 3.562 | 1.68893 | 31.16 |
| 22* | 54.110 | variable | | |
| 23 | −3364.237 | 2.985 | 1.58913 | 61.25 |
| 24 | −29.448 | 1.266 | | |
| 25 | 22.776 | 5.258 | 1.54814 | 45.82 |
| 26 | −30.258 | 1.313 | 1.92119 | 23.96 |
| 27 | −731.583 | variable | | |
| 28 | 737.883 | 1.887 | 1.84666 | 23.78 |
| 29 | −61.147 | 1.182 | 1.77250 | 49.62 |
| 30 | 34.326 | variable | | |
| image | infinity | | | |

Aspheric data

| i | K | A4 | A6 | A8 |
|---|---|---|---|---|
| 14 | 0.0000e+000 | 2.3605e−006 | 2.1209e−007 | −2.0777e−009 |
| 15 | 0.0000e+000 | 3.2494e−005 | 1.9433e−007 | −1.0779e−009 |
| 22 | 0.0000e+000 | −7.3333e−006 | 9.7558e−009 | −6.0062e−010 |

| i | A10 | A12 | A14 | A16 |
|---|---|---|---|---|
| 14 | 2.3951e−011 | −4.6069e−014 | 0.0000e+000 | 0.0000e+000 |
| 15 | 1.4428e−011 | 0.0000e+000 | 0.0000e+000 | 0.0000e+000 |
| 22 | 3.8986e−012 | 0.0000e+000 | 0.0000e+000 | 0.0000e+000 |

Various types of data
zoom ratio 14.12

| | Wide angle (W) | Middle (M) | Telephoto (T) |
|---|---|---|---|
| Fl | 19.051 | 72.465 | 269.075 |
| Fno. | 3.587 | 5.200 | 6.834 |
| ω | 36.699 | 11.087 | 3.021 |
| y'max | 14.200 | 14.200 | 14.200 |
| TL | 146.534 | 183.899 | 242.249 |
| BF | 31.781 | 53.780 | 90.541 |
| d5 | 2.242 | 35.137 | 69.619 |
| d13 | 31.761 | 9.082 | 1.313 |
| d19 | 1.576 | 5.179 | 5.345 |
| d22 | 6.382 | 2.779 | 2.613 |
| d27 | 1.949 | 7.098 | 1.975 |
| d30 | 31.781 | 53.780 | 90.541 |

Zoom lens group data

| Group j (surface i) | focal length fj |
|---|---|
| 1 (1-5) | 118.619 |
| 2 (6-13) | −15.247 |
| 3 (14-19) | 28.848 |
| 4 (20-22) | −42.775 |
| 5 (23-27) | 29.316 |
| 6 (28-30) | −49.791 |

Example 5 unit: mm
Surface data

| i | r | d | nd | vd |
|---|---|---|---|---|
| object | infinity | infinity | | |
| 1 | 86.112 | 1.576 | 1.84666 | 23.78 |
| 2 | 62.133 | 8.793 | 1.48749 | 70.44 |
| 3 | 714.022 | 0.131 | | |
| 4 | 76.398 | 5.444 | 1.48749 | 70.44 |
| 5 | 352.463 | variable | | |
| 6 | 69.152 | 1.182 | 1.80420 | 46.50 |
| 7 | 15.685 | 7.205 | | |
| 8 | −46.212 | 1.182 | 1.80420 | 46.50 |
| 9 | 56.371 | 1.969 | | |
| 10 | 33.885 | 4.462 | 1.84666 | 23.78 |
| 11 | −53.509 | 0.915 | | |
| 12 | −30.483 | 1.182 | 1.77250 | 49.62 |
| 13 | 224.479 | variable | | |
| 14* | 29.735 | 3.320 | 1.58313 | 59.46 |
| 15* | −465.847 | 1.778 | | |
| 16 (stop) | infinity | 2.684 | | |
| 17 | 49.974 | 1.182 | 1.84666 | 23.78 |
| 18 | 23.841 | 5.589 | 1.49700 | 81.61 |
| 19 | −33.700 | variable | | |
| 20 | −114.395 | 1.182 | 1.77250 | 49.62 |
| 21 | 15.358 | 3.653 | 1.68893 | 31.16 |
| 22* | 57.790 | variable | | |
| 23 | 118.153 | 3.282 | 1.58913 | 61.25 |
| 24 | −32.113 | 0.131 | | |
| 25 | 29.147 | 5.392 | 1.54814 | 45.82 |
| 26 | −24.215 | 1.313 | 1.92119 | 23.96 |
| 27 | −155.747 | variable | | |
| 28 | 556.685 | 1.905 | 1.84666 | 23.78 |
| 29 | −67.895 | 1.182 | 1.77250 | 49.62 |
| 30 | 37.373 | variable | | |
| image | infinity | | | |

Aspheric data

| i | K | A4 | A6 | A8 |
|---|---|---|---|---|
| 14 | 0.0000e+000 | −2.3513e−005 | −2.5817e−007 | 1.7722e−009 |
| 15 | 0.0000e+000 | −6.4556e−006 | −3.1166e−007 | 3.0837e−009 |
| 22 | 0.0000e+000 | −8.0842e−006 | 1.7449e−008 | −6.3131e−010 |

| i | A10 | A12 | A14 | A16 |
|---|---|---|---|---|
| 14 | −1.4504e−011 | −8.8652e−014 | 0.0000e+000 | 0.0000e+000 |
| 15 | −3.0365e−011 | 0.0000e+000 | 0.0000e+000 | 0.0000e+000 |
| 22 | 3.5034e−012 | 0.0000e+000 | 0.0000e+000 | 0.0000e+000 |

Various types of data
zoom ratio 14.12

| | Wide angle (W) | Middle (M) | Telephoto (T) |
|---|---|---|---|
| Fl | 19.046 | 72.467 | 268.996 |
| Fno. | 3.587 | 5.200 | 6.834 |
| ω | 36.706 | 11.087 | 3.022 |
| y'max | 14.200 | 14.200 | 14.200 |
| TL | 146.490 | 182.292 | 242.252 |
| BF | 34.992 | 57.871 | 92.058 |
| d5 | 1.873 | 32.095 | 71.816 |
| d13 | 32.748 | 8.247 | 1.473 |
| d19 | 1.576 | 5.264 | 6.058 |
| d22 | 6.714 | 3.025 | 2.232 |
| d27 | 1.955 | 9.157 | 1.983 |
| d30 | 34.992 | 57.871 | 92.058 |

Zoom lens group data

| Group j (surface i) | focal length fj |
|---|---|
| 1 (1-5) | 120.184 |
| 2 (6-13) | −15.512 |
| 3 (14-19) | 29.172 |
| 4 (20-22) | −40.801 |
| 5 (23-27) | 29.766 |
| 6 (28-30) | −55.586 |

Example 6 unit: mm
Surface data

| i | r | d | nd | vd |
|---|---|---|---|---|
| object | infinity | infinity | | |
| 1 | 87.215 | 1.576 | 1.84666 | 23.78 |
| 2 | 62.595 | 8.908 | 1.48749 | 70.44 |
| 3 | 1135.977 | 0.131 | | |
| 4 | 78.697 | 5.383 | 1.48749 | 70.44 |
| 5 | 378.711 | variable | | |
| 6 | 66.428 | 1.182 | 1.80420 | 46.50 |
| 7 | 15.779 | 7.183 | | |
| 8 | −40.121 | 1.182 | 1.80420 | 46.50 |
| 9 | 60.192 | 1.918 | | |
| 10 | 35.463 | 4.379 | 1.84666 | 23.78 |
| 11 | −50.277 | 0.889 | | |
| 12 | −29.560 | 1.182 | 1.77250 | 49.62 |
| 13 | 329.661 | variable | | |
| 14 | 26.180 | 3.243 | 1.61800 | 63.39 |
| 15 | 89.539 | 0.168 | 1.51380 | 52.97 |
| 16* | 171.097 | 2.487 | | |
| 17 (stop) | infinity | 1.313 | | |
| 18 | 50.692 | 1.182 | 1.84666 | 23.78 |
| 19 | 25.518 | 5.838 | 1.49700 | 81.61 |
| 20 | −32.203 | variable | | |
| 21 | −104.742 | 1.182 | 1.77250 | 49.62 |
| 22 | 16.159 | 3.693 | 1.68893 | 31.16 |
| 23* | 56.365 | variable | | |
| 24 | 121.993 | 3.526 | 1.58913 | 61.25 |
| 25 | −30.290 | 0.131 | | |
| 26 | 29.497 | 5.640 | 1.54814 | 45.82 |
| 27 | −24.201 | 1.313 | 1.92119 | 23.96 |
| 28 | −159.522 | variable | | |
| 29 | 363.383 | 1.924 | 1.84666 | 23.78 |
| 30 | −76.338 | 1.182 | 1.77250 | 49.62 |
| 31 | 36.527 | variable | | |
| image | infinity | | | |

Aspheric data

| i | K | A4 | A6 | A8 |
|---|---|---|---|---|
| 16 | 6.1412e+001 | 2.5482e−005 | −4.1642e−008 | 9.8372e−010 |
| 23 | 0.0000e+000 | −8.1762e−006 | −3.7556e−009 | −1.3241e−010 |

| i | A10 | A12 | A14 | A16 |
|---|---|---|---|---|
| 16 | −8.7731e−012 | 2.7162e−014 | 0.0000e+000 | 0.0000e+000 |
| 23 | 6.2634e−013 | 0.0000e+000 | 0.0000e+000 | 0.0000e+000 |

Various types of data
zoom ratio 14.12

| | Wide angle (W) | Middle (M) | Telephoto (T) |
|---|---|---|---|
| Fl | 19.045 | 72.460 | 268.977 |
| Fno. | 3.587 | 5.200 | 6.834 |
| ω | 36.709 | 11.088 | 3.022 |
| y'max | 14.200 | 14.200 | 14.200 |
| TL | 146.501 | 181.708 | 242.181 |
| BF | 35.275 | 60.435 | 91.859 |
| d5 | 1.828 | 28.482 | 71.318 |
| d13 | 31.843 | 7.710 | 1.422 |
| d20 | 1.576 | 6.092 | 6.564 |
| d23 | 7.287 | 2.774 | 2.298 |
| d28 | 1.958 | 9.483 | 1.985 |
| d31 | 35.275 | 60.435 | 91.859 |

Zoom lens group data

| Group j (surface i) | focal length fj |
|---|---|
| 1 (1-5) | 119.147 |
| 2 (6-13) | −15.310 |
| 3 (14-20) | 29.082 |
| 4 (21-23) | −39.696 |
| 5 (24-28) | 29.187 |
| 6 (29-31) | −56.332 |

Example 7 unit: mm
Surface data

| i | r | d | nd | vd |
|---|---|---|---|---|
| object | infinity | infinity | | |
| 1 | 81.334 | 1.576 | 1.84666 | 23.78 |
| 2 | 58.713 | 8.749 | 1.48749 | 70.44 |
| 3 | 1143.504 | 0.131 | | |
| 4 | 79.732 | 5.246 | 1.48749 | 70.44 |
| 5 | 383.047 | variable | | |
| 6 | 65.579 | 1.182 | 1.80420 | 46.50 |
| 7 | 14.138 | 7.109 | | |
| 8 | −34.361 | 1.182 | 1.80420 | 46.50 |
| 9 | 73.648 | 0.131 | | |
| 10 | 31.477 | 4.458 | 1.84666 | 23.78 |
| 11 | −44.838 | 0.852 | | |
| 12 | −27.237 | 1.182 | 1.77250 | 49.62 |
| 13 | infinity | variable | | |
| 14 (stop) | infinity | 1.313 | | |
| 15 | 22.141 | 3.287 | 1.61800 | 63.39 |
| 16 | 53.768 | 0.197 | 1.51380 | 52.97 |
| 17* | 91.605 | 2.871 | | |
| 18 | 88.218 | 1.182 | 1.84666 | 23.78 |
| 19 | 30.773 | 6.094 | 1.49700 | 81.61 |
| 20 | −26.232 | variable | | |
| 21 | −120.734 | 1.182 | 1.77250 | 49.62 |
| 22 | 15.355 | 4.001 | 1.68893 | 31.16 |
| 23* | 56.639 | variable | | |
| 24 | 132.608 | 3.481 | 1.58913 | 61.25 |
| 25 | −32.196 | 1.231 | | |
| 26 | 27.037 | 5.698 | 1.54814 | 45.82 |
| 27 | −25.780 | 1.313 | 1.92119 | 23.96 |
| 28 | −260.537 | variable | | |
| 29 | 296.776 | 1.973 | 1.84666 | 23.78 |
| 30 | −72.803 | 1.182 | 1.77250 | 49.62 |
| 31 | 35.286 | variable | | |
| image | infinity | | | |

Aspheric data

| i | K | A4 | A6 | A8 |
|---|---|---|---|---|
| 17 | 2.3627e+001 | 3.4125e−005 | −1.0678e−008 | 4.3372e−010 |
| 23 | 0.0000e+000 | −8.0329e−006 | −6.8365e−009 | −1.4852e−010 |

| i | A10 | A12 | A14 | A16 |
|---|---|---|---|---|
| 17 | −3.4365e−012 | 7.5166e−015 | 0.0000e+000 | 0.0000e+000 |
| 23 | 7.2251e−013 | 0.0000e+000 | 0.0000e+000 | 0.0000e+000 |

Various types of data
zoom ratio 14.12

| | Wide angle (W) | Middle (M) | Telephoto (T) |
|---|---|---|---|
| Fl | 19.052 | 72.465 | 268.951 |
| Fno. | 3.587 | 5.200 | 6.834 |
| ω | 36.698 | 11.087 | 3.022 |
| y'max | 14.200 | 14.200 | 14.200 |
| TL | 146.468 | 183.332 | 242.185 |
| BF | 35.039 | 60.849 | 92.396 |
| d5 | 1.768 | 28.614 | 69.445 |
| d13 | 31.841 | 8.815 | 2.626 |
| d20 | 1.576 | 6.118 | 6.588 |
| d23 | 7.356 | 2.814 | 2.343 |
| d28 | 2.088 | 9.323 | 1.986 |
| d31 | 35.039 | 60.849 | 92.396 |

-continued

Zoom lens group data

| Group j (surface I | focal length fj |
|---|---|
| 1 (1-5) | 115.590 |
| 2 (6-13) | −14.811 |
| 3 (14-20) | 29.163 |
| 4 (21-23) | −40.947 |
| 5 (24-28) | 30.147 |
| 6 (29-31) | −55.864 |

TABLE 1

| Related data | fw | f1 | f6 | bfw |
|---|---|---|---|---|
| EX1 | 19.055 | 116.509 | −52.520 | 26.754 |
| EX2 | 19.057 | 124.038 | −47.284 | 31.827 |
| EX3 | 19.054 | 122.651 | −49.808 | 33.369 |
| EX4 | 19.051 | 118.619 | −49.791 | 31.781 |
| EX5 | 19.046 | 120.184 | −55.586 | 34.992 |
| EX6 | 19.045 | 119.147 | −56.332 | 35.275 |
| EX7 | 19.052 | 115.590 | −55.864 | 35.039 |

| Related date | M1 | M2 | T6 | f2 |
|---|---|---|---|---|
| EX1 | 95.748 | 30.710 | 3.265 | −15.719 |
| EX2 | 95.723 | 24.152 | 3.188 | −15.801 |
| EX3 | 95.718 | 23.881 | 3.148 | −15.340 |
| EX4 | 95.715 | 28.338 | 3.069 | −15.247 |
| EX5 | 95.762 | 25.819 | 3.087 | −15.512 |
| EX6 | 95.680 | 26.190 | 3.106 | −15.310 |
| EX7 | 95.717 | 28.039 | 3.155 | −14.811 |

TABLE 2

| Values corresponding to conditional expressions | (1) f1/fw | (2) f6/bfw | (3) vdp |
|---|---|---|---|
| EX1 | 6.114 | −1.963 | 81.61 |
| EX2 | 6.509 | −1.486 | 81.61 |
| EX3 | 6.437 | −1.493 | 81.61 |
| EX4 | 6.226 | −1.567 | 81.61 |
| EX5 | 6.310 | −1.589 | 81.61 |
| EX6 | 6.256 | −1.597 | 81.61 |
| EX7 | 6.067 | −1.594 | 81.61 |

| Values corresponding to conditional expressions | (4) M2/M1 | (5) T6/fw | (6) f2/fw |
|---|---|---|---|
| EX1 | 0.321 | 0.171 | −0.825 |
| EX2 | 0.252 | 0.167 | −0.829 |
| EX3 | 0.249 | 0.165 | −0.805 |
| EX4 | 0.296 | 0.161 | −0.800 |
| EX5 | 0.270 | 0.162 | −0.814 |
| EX6 | 0.274 | 0.163 | −0.804 |
| EX7 | 0.293 | 0.166 | −0.777 |

Although embodiments of the present invention have been described and illustrated in detail, the disclosed embodiments are made for purposes of illustration and example only and not limitation. The scope of the present invention should be interpreted by terms of the appended claims.

What is claimed is:

1. A zoom lens comprising: in order from an object side, a first lens group having positive refractive power; a second lens group having negative refractive power; a third lens having positive refractive power; a fourth lens group having negative refractive power; a fifth lens group having positive refractive power; and a sixth lens group having negative refractive power, wherein an interval between each of adjacent lens groups varies at zooming, the sixth lens group moves on an optical axis at focusing in a range from an object at infinity to an object at close proximity, and the following conditional expressions (1) and (2) are satisfied:

$$5.7 \leq f1/fw \leq 10.0 \quad (1)$$

$$-3.00 \leq f6/bfw \leq -1.35 \quad (2)$$

where fw is a focal length of an entire system at a wide angle end, f1 is the focal length of the first lens group, f6 is the focal length of the sixth lens group, and bfw is a back focus at the wide angle end.

2. The zoom lens according to claim 1, wherein the third lens group includes at least one positive lens that satisfies the following conditional expression (3):

$$vdp \geq 65 \quad (3)$$

where vdp is an Abbe number of the positive lens in the third lens group.

3. The zoom lens according to claim 1, wherein camera shake correction is performed by moving the fourth lens group as a camera shake correction group in a direction orthogonal to the optical axis.

4. The zoom lens according to claim 1, wherein the following conditional expression (4) is satisfied:

$$0.1 \leq M2/M1 \leq 0.5 \quad (4)$$

where

M1 is an amount of movement of the first lens group on the optical axis at zooming from the wide angle end to a telephoto end, and M2 is the amount of movement of the second lens group on the optical axis at zooming from the wide angle end to the telephoto end.

5. The zoom lens according to claim 1, wherein the sixth lens group includes one positive lens and one negative lens, and satisfies the following conditional expression (5):

$$0.1 \leq T6/fw \leq 0.3 \quad (5)$$

where fw is the focal length of the entire system at the wide angle end, and

T6 is a thickness of the sixth lens group on the optical axis.

6. The zoom lens according to claim 1, wherein the following conditional expression (6) is satisfied:

$$-1.2 \leq f2/fw \leq -0.76 \quad (6)$$

where fw is the focal length of the entire system at the wide angle end, and f2 is the focal length of the second lens group.

7. An imaging optical device comprising:

the zoom lens according to claim 1; and an image sensor that converts an optical image formed on a light receiving surface into an electrical signal, wherein the zoom lens is provided so as to form an optical image of a subject on the light receiving surface of the image sensor.

8. A digital device comprising the imaging optical device according to claim 7, wherein at least one function of capturing a still image or capturing a moving image of a subject has been added by including the imaging optical device.

* * * * *